United States Patent [19]

Chiu et al.

[11] Patent Number: 6,107,979
[45] Date of Patent: *Aug. 22, 2000

[54] MONOLITHIC PROGRAMMABLE FORMAT PIXEL ARRAY

[75] Inventors: Edison H. Chiu, Richardson; Quang Dieu An, Plano; Kevin Kornher, Dallas, all of Tex.

[73] Assignee: Texas Instruments Incorporated, Dallas, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/832,135

[22] Filed: Apr. 3, 1997

Related U.S. Application Data

[63] Continuation of application No. 08/373,692, Jan. 17, 1995, abandoned.

[51] Int. Cl.[7] ............................................. G09G 3/34
[52] U.S. Cl. ................................... 345/84; 345/100
[58] Field of Search .......................... 345/31, 214, 108, 345/109, 97, 127, 132, 215, 204, 48, 32, 87, 84; 348/770, 771

[56] References Cited

U.S. PATENT DOCUMENTS

| | | | |
|---|---|---|---|
| 4,746,915 | 5/1988 | Sekiya | 340/719 |
| 4,910,687 | 3/1990 | Butler et al. | 364/521 |
| 4,956,610 | 9/1990 | Galm et al. | 324/425 |
| 5,017,914 | 5/1991 | Uchida et al. | 340/784 |
| 5,061,049 | 10/1991 | Hornbeck | 359/224 |
| 5,079,544 | 1/1992 | DeMond et al. | 340/701 |
| 5,091,723 | 2/1992 | Kanno et al. | 345/97 X |
| 5,105,369 | 4/1992 | Nelson | 364/525 |
| 5,162,786 | 11/1992 | Fukuda | 340/784 |
| 5,170,158 | 12/1992 | Shinya | 340/800 |
| 5,278,652 | 1/1994 | Urbanus et al. | 358/160 |
| 5,307,056 | 4/1994 | Urbanus | 340/189 |
| 5,307,085 | 4/1994 | Nakamura | 345/99 |
| 5,506,597 | 4/1996 | Thompson et al. | 348/771 |

FOREIGN PATENT DOCUMENTS 22347713  2/1989  United Kingdom .

Primary Examiner—Chanh Nguyen
Attorney, Agent, or Firm—Charles A. Brill; Wade James Brady, III; Frederick J. Telecky, Jr.

[57] ABSTRACT

A spatial light modulator (10) with a programmable format pixel array (14). The pixel array (14) has a programmable row address circuit (30), and a partitionable programmable column data loading circuit (32) which permits the array (14) to be operated in multiple formats compatible with NTSC, PAL, SECAM and other broadcasting standards. The pixel array (14) is of the DMD type. The array can be configured as 864×576 pixel array, a 768×576 pixel array, an 864×480 pixel array, or a 640×480 pixel array. This format is controlled by hardware (30,32) designed into the DMD chip. A partitionable shift register (32) has a MUXED input to provide testability, permitting some or all of the data input lines (D0–D53) to be utilized, and also allowing pixel data to be loaded back into the shift register (32) for functional verification. A programmable row address circuit (30) automatically addresses a subset of pixel rows as a function of a single input.

24 Claims, 18 Drawing Sheets

SYNCHRONOUS ADDRESS COUNTER MODE OF OPERATION

NORMAL MODE PARALLEL WRITE, 54-BIT INPUT (D0,D1...D53)

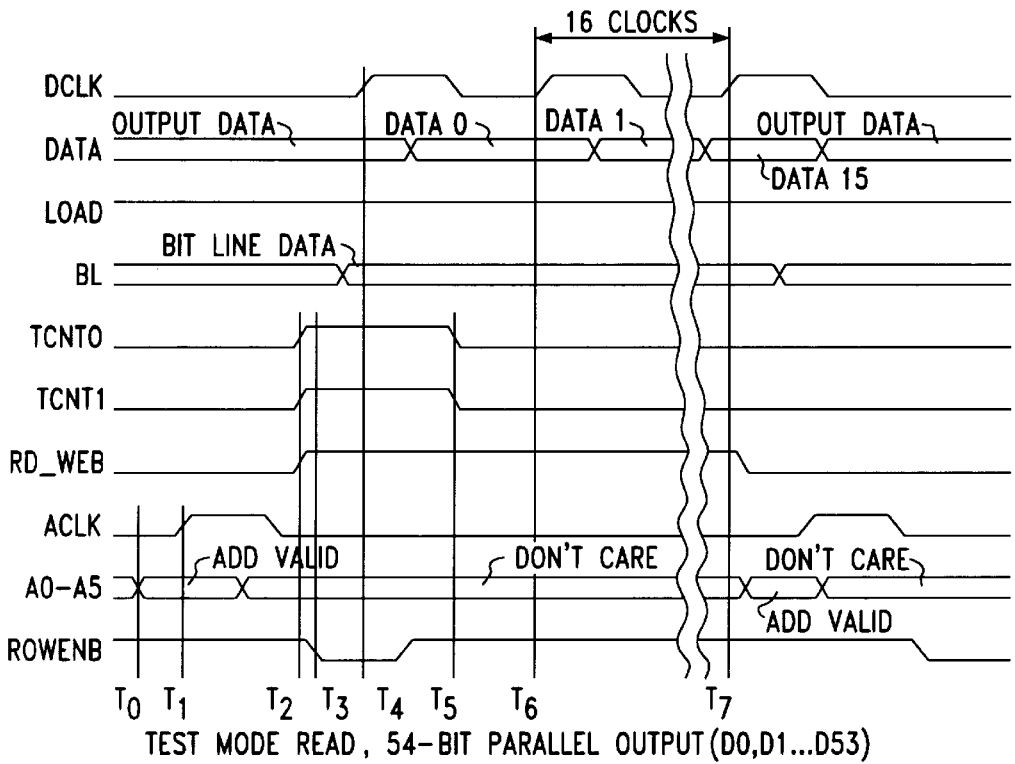
Fig. 18 TEST MODE READ, 54-BIT PARALLEL OUTPUT (D0,D1...D53)
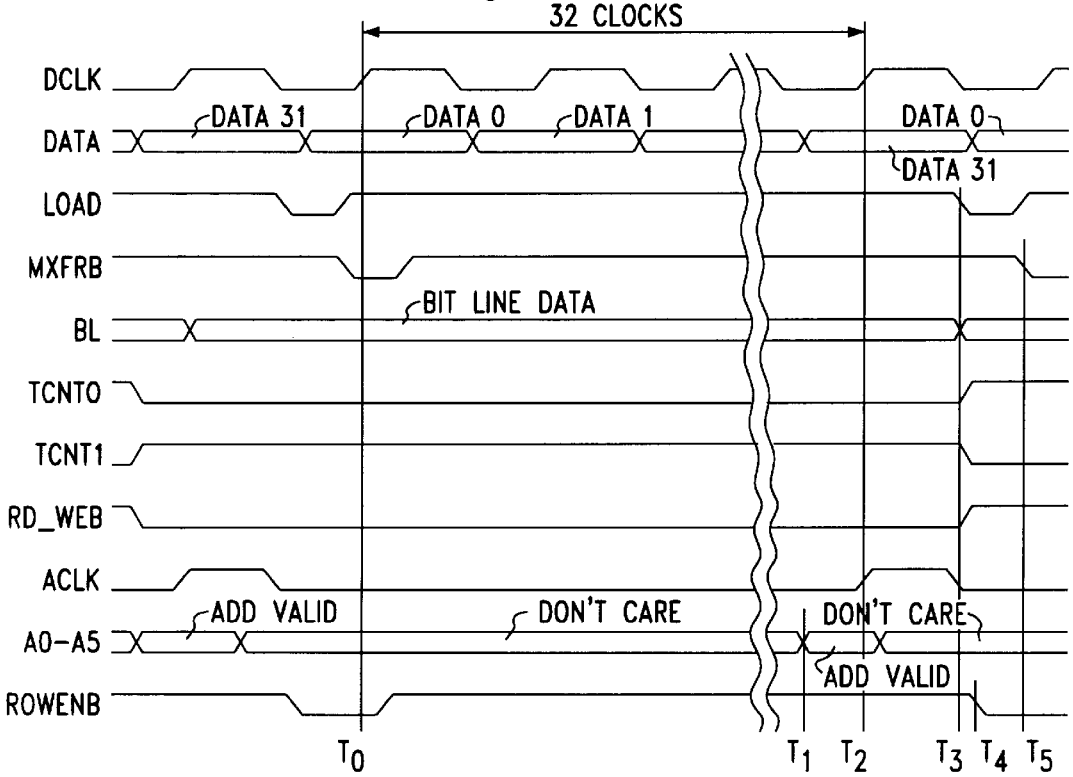
Fig. 19 NORMAL MODE PARALLEL WRITE, 27-BIT INPUT (D0,D2...D52)

TEST MODE READ, 1-BIT OUTPUT(SDOUT)

MONOLITHIC PROGRAMMABLE FORMAT PIXEL ARRAY

This application is a continuation of application Ser. No. 08/373,692, filed Jan. 17, 1995 now abandoned.

CROSS REFERENCE TO RELATED APPLICATIONS

Cross reference is made to the following co-pending patent applications each assigned to the same assignee as the present invention and the teachings incorporated herein by reference:

| Ser. No. | Date Filed | Title |
| --- | --- | --- |
| 08/002,627 | 01/08/93 | Pixel Control Circuitry for Spatial Light Modulator |
| 08/346,812 | 11/30/94 | Spatial Light Modulator with Reduced Possibility of an on State Defect |
| 08/346,707 | 11/30/94 | Memory Cell with Single Bit Line Read Back |

FIELD OF THE INVENTION

This invention relates generally to monolithic spatial light modulators having pixel arrays which may be implemented in a video/graphics display or used in an electronic printer, and more particularly to a universal pixel array with a programmable active size supporting several broadcast formats including NTSC, PAL and SECAM.

BACKGROUND OF THE INVENTION

Graphics and video display systems, such as displays for computer systems, terminals and televisions, are typically comprised of an array of addressable picture elements (pixels). Source pixel data is first formatted by an associated control circuit, and then loaded into the pixel array one frame at a time. This pixel data may be written to the pixel array using a variety of algorithms, i.e. sequentially top-to-bottom one pixel line at a time, interleaving by sequentially addressing top-to-bottom every other pixel line, such as the odd rows of pixels, and then returning to address the even pixel lines, etc. In cathode ray tubes (CRTs) this data writing technique is known as rasterizing, whereby a high powered electrode gun scans across the pixel elements of a phosphor screen left to right, one line at a time. This data writing scheme is applicable to liquid crystal displays (LCD's) as well.

Irregardless of the algorithm implemented to load the pixel array with a frame of pixel data, the pixel array needs to display at least 20 frames of data per second for the human eye to perceive a smooth motion picture. If the pixel array displays less than 20 frames of video data per second, the displayed image will appear as a series of stepped discrete picture frames.

A recent innovation of Texas Instruments Incorporated of Dallas Tex., is the digital micro-mirror device (DMD). The DMD is suitable for use in displays, projectors and hard copy printers. The DMD is a monolithic single-chip integrated circuit spatial light modulator (SLM), comprised of a high density array of 17 micron square movable micro mirrors. These mirrors are fabricated over an address circuitry including an array of SRAM cells and address electrodes. Each mirror forms one pixel of the DMD array and is bi-stable, that is to say, stable in one of two positions, wherein a source of light directed upon the mirror array will be reflected in one of two directions. In one stable "on" mirror position, light will be reflected to a collector lens and focused on a display screen. In the other "off" mirror position, light directed on the mirror will be deflected to a light absorber. Each mirror of the array is individually controlled to either direct light into the collector lens, or to the light absorber. The collector lens and a light prism ultimately focus and magnify light from the pixel mirrors onto a display screen and produce an image. If each pixel mirror of the DMD array is in the "on" position, the image will be an array of bright pixels.

For a more detailed discussion of the DMD device, cross reference is made to U.S. Pat. No. 5,061,049 to Hornbeck, entitled "Spatial Light Modulator and Method"; U.S. Pat. No. 5,079,544 to DeMond, et al, entitled "Standard Independent Digitized Video System"; and U.S. Pat. No. 5,105,369 to Nelson, entitled "Printing System Exposure Module Alignment Method and Apparatus of Manufacture", each patent being assigned to the same assignee of the present invention and the teachings of each are incorporated herein by reference. Gray scale of the pixels forming the image is achieved by pulse width modulation techniques of the mirrors, such as that described in U.S. Pat. No. 5,278,652, entitled "DMD Architecture and Timing for Use in a Pulse-Width Modulated Display System", assigned to the same assignee of the present invention, and the teachings of which are incorporated herein by reference.

The dimensions of pixel arrays including the DMD array, that is, the number of pixel rows and columns, and the corresponding aspect ratio of the image generated by the pixel array, are designed to conform to one of various national broadcast standards. In the United States, the NTSC is the standard broadcast format to which television displays are designed to meet. In other countries, however, other display format standards are established. For instance, in Europe the PAL broadcast format standard is established. In Japan, the NTSC format standard is established. Thus, the particular national broadcast format standards dictate how pixel images are to be displayed in a particular country. The NTSC format, for instance, sets forth that images will comprise of 480 lines by 640 columns pixels. This corresponds to a 4:3 aspect ratio. The PAL format, however, sets forth that images comprise 576 rows of pixels by 768 columns of pixels, corresponding to a 16:9 aspect ratio.

The DMD is revolutionary in that it is truly a digital display device and an integrated circuit solution. Because the DMD is a digital device, it is well suited for a wide range of hardware and software programmability. It is desired to provide a single hardware programmable pixel array that may be implemented into a display system, and provide an integrated solution over a wide range of video formats. More specifically, it is desirable to provide a hardware programmable pixel array for displaying images compatible with either the NTSC, PAL, and SECAM broadcast formats. This necessitates that the active pixel array be programmable both as to the number of horizontal pixel rows utilized, as well as the number of vertical pixel columns implemented.

In the case of the DMD, it is also desirable to provide a programmable architecture which has a reduced number of package pins to reduce the cost of manufacturing the device. In addition, it is desirable to provide the ability to operate and fully test the device with only a few functional pins. This design would reduce the bandwidth of pixel data and allow the device to be quickly checked out at wafer test with minimal physical damage during probing, which non-functional dies being bypassed or rejected during final optical testing.

SUMMARY OF THE INVENTION

The present invention finds technical advantages as a programmable format pixel array. The pixel array can be selectively formatted to have an active pixel array conforming to the NTSC, PAL, or SECAM national broadcast format, thus rendering a device which is uniquely versatile, whereby one array device can be affordably manufactured for use in displays used around the world.

The programmable format pixel array comprises a monolithic device having m rows of pixels and n columns of pixels. Hardware programmable row address circuitry is coupled to the pixel array to selectively address the m rows of pixels that pixel data is written into the memory array. This row address circuitry also includes means to selectively utilize a subset of m pixel rows as a frame of data is written to the memory array. Hardware programmable column data load circuitry is coupled to the pixel array for selectively loading pixel data to a subset or all the n pixel columns.

The unique row address circuitry permits all, or less than all of the m pixel rows to be implemented in a display device. For instance, in a pixel array having 576 rows of pixels, the middle 480 rows of pixels may be utilized. The top 48 rows of pixels, and the lower 48 rows of pixels would not be written to, and thus, would not contribute to the display image generated by the pixel array.

According to the preferred embodiment of the present invention, the column data load circuitry further comprises means to selectively format the loading of pixel data to all, or a subset of n pixel columns. In the preferred embodiment, an array having 864 columns of pixels can be formatted to implement only a middle portion of these pixel columns. For instance, the middle 768 columns of pixels may be implemented, or the middle 640 columns of pixels may be implemented. The unused columns of pixels at each end of the array are not utilized and are automatically loaded with a logic "0", and thus do not contribute to the display image.

According to the present invention, the single hardware programmable format pixel array can be utilized to realize a functional pixel array having dimensions of 864×576 active pixels, 768×576 active pixels, 864×480 active pixels, or 640×480 active pixels, as a function of a single data entry. The number of pixels implemented in the horizontal and vertical direction, and the corresponding aspect ratio realized, conforms to various national broadcast format standards such as the NTSC, PAL, and SECAM formats. The programmable format pixel array according to the present invention is preferably a monolithic DMD, whereby each pixel element comprises a 17 micron square micromirror fabricated over corresponding address circuitry including an associated memory cell. Since the DMD is truly a digital device, it is well suited as a programmable format pixel array according to the present invention.

The format control circuitry for the pixel row addressing and column data loading is designed to require few control signals. In the preferred embodiment, a combination 5/6-bit counter and row decoder/mapper is implemented for row addressing. Both the counter and the decoder/mapper are configured as a function of a VSIZE control input. When a logic "0" is provided to this VSIZE input, column data will be sequentially written to all 36 rows of memory cells controlling the pixel rows. When a logic "one" signal is provided to this VSIZE input, the counter and the row decoder/mapper function to sequentially write column data to a middle subset of 30 memory cells rows, automatically, wherein all unused memory cells are loaded with a logic "zero". Thus, depending on the logic signal provided to this VSIZE input, either 36 rows of memory cells controlling 576 pixel mirrors will be used or the middle 30 rows of memory cells controlling 480 pixel mirrors will be implemented. This selection is hardware programmable.

The pixel column data load circuitry comprises a selectively partitionable shift register. This shift register is selectively partitionable into a plurality of shift registers, each having dedicated MUXED inputs and parallel Q outputs. The parallel Q outputs of each shift register are coupled and drive a dedicated set of the pixel columns. In the preferred embodiment, this shift register circuitry comprises a single 864-bit serial shift register, partitionable as twenty seven (27) 32-bit shift registers, or fifty-four (54) 16-bit shift registers. Two control signals TCNT0 and TCNT1 provided to a logic circuit determine the architecture of the shift register(s) which provide data to, or receive data from, the pixel array.

In the preferred embodiment comprising a baseline 864× 576 pixel array, some or all of the 864 pixel columns can be implemented into the display due to the partitionability of the shift register circuitry. When the shift register circuit is partitioned as a series of 16-bit shift registers, or as a series of 32-bit shift registers, pixel data can be loaded to only the D inputs of those middle shift registers necessary to write data to the corresponding middle column of pixels.

For instance, when partitioned as 16-bit shift registers, pixel data may be loaded into only the inputs D3–D50 corresponding to the 4th through the 51st 16-bit shift register, no data being provided to the inputs D0–D2 and D51–D53 corresponding to the 1st through 3rd shift register and the 52nd through 54th shift register. Therefore, only the middle 768 columns of pixel mirrors are utilized. To utilize only the middle 640 columns of pixel mirrors, data is loaded into the inputs D6–D47 corresponding to the 7th through the 48th 16-bit shift register, with no data being provided to the input D0–D5 and D48–D53 corresponding to the 1st through 6th and 49th through 54th 16-bit shift register.

When the shift register circuitry is partitioned as 32-bit shift registers, only selected even inputs D0, D2 . . . D52 of the shift register circuitry are used, with the odd inputs D1, D3 . . . D53 not being used.

To facilitate testing the programmable pixel array, an 864-bit data complementer circuit is provided between the shift registers and the pixel array. This data complementer circuit is controlled to pass pixel data from the shift registers to the pixel array as true (uninverted) data, or inverted as a function of a single COMP input. The shift registers can be loaded with all "is" with a logic "1" on control line LSET, wherein this COMP input can be toggled as rows of memory cells are sequentially written to, thus realizing interleaved rows of pixel mirrors being all "on" or "off".

The MUX input of the shift register circuit is controllable so as also to shift in pixel data in parallel from the pixel array memory cells during a testing routine, thereby permitting the functionality of the pixel memory array to be verified. In the testing mode, pixel data is parallel shifted in from selected pixel array memory cells into the QIN inputs of the shift register circuit. The data is then shifted out of the register serially or in parallel to obtain the 864 bits of data. Thus, the shift register circuit is versatile whereby it can be selectively partitioned into a plurality of shift registers, during both the array write and read cycle, but also formatted as a single 864-bit shift register.

BRIEF DESCRIPTION OF THE DRAWINGS

FIG. 18 is a timing diagram of the test (read) mode for the 54-line parallel output of that embodiment shown in FIG. 1;

FIG. 19 is a timing diagram of the write mode for the 27-line parallel input array of that embodiment shown in FIG. 13;

DESCRIPTION OF THE PREFERRED EMBODIMENT

Figure 1:
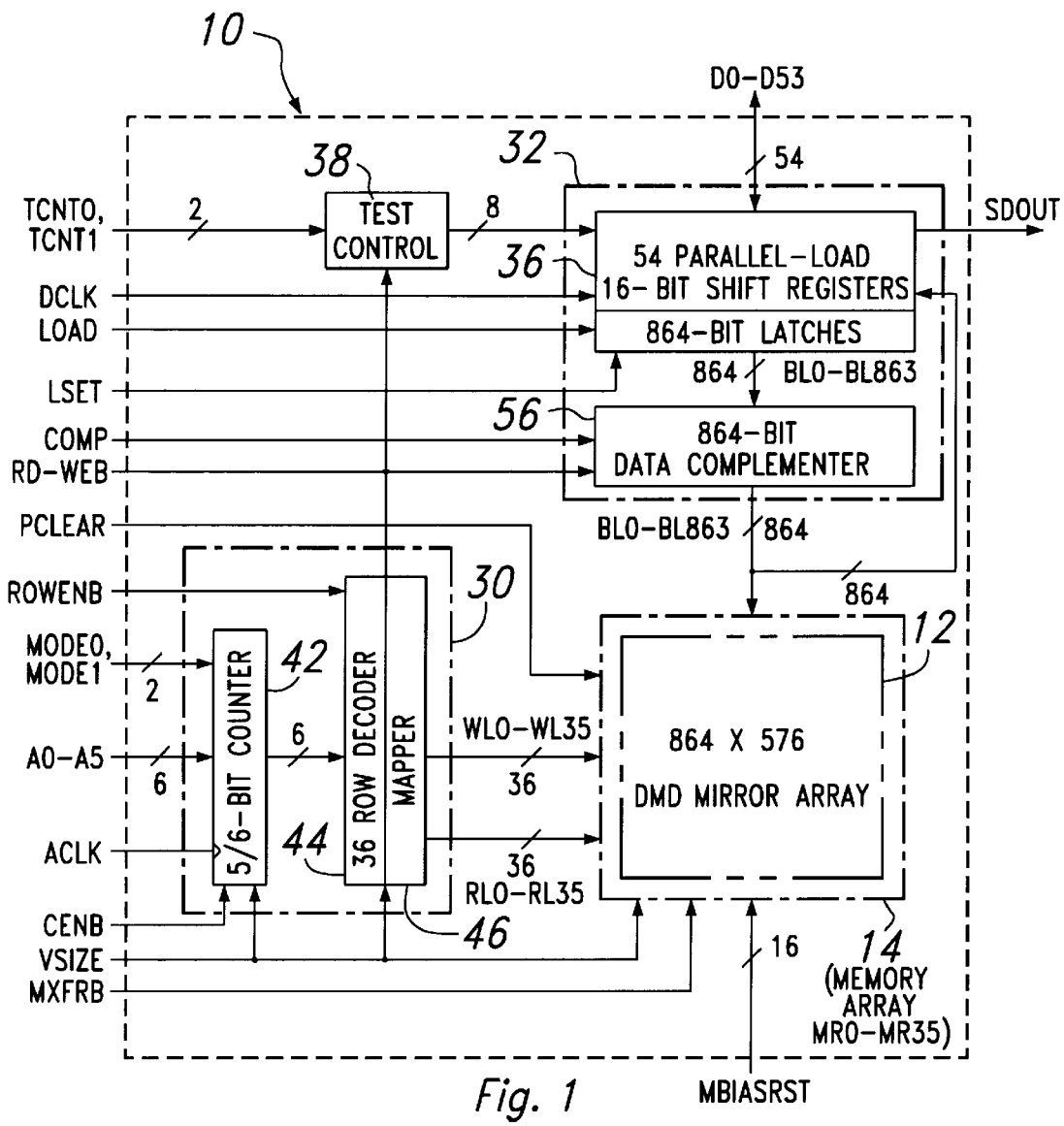
FIG. 1 is a block diagram of the programmable format pixel array including programmable row address and column data loading circuitry according to the preferred embodiment of the invention.

Referring now to FIG. 1, a programmable format pixel array device according to the present invention is generally shown at 10. Device 10 is a digital micro mirror device (DMD) single-chip integrated circuit seen to include an 864×576 micro mirror array 12, where each of these micro mirrors comprise one pixel. Peripheral control circuitry and an underlying 864×36 array of memory cells 14 control these mirrors and provide on-chip programmable features including supporting four active array formats of the 864× 576 DMD mirror array.

Figure 2:
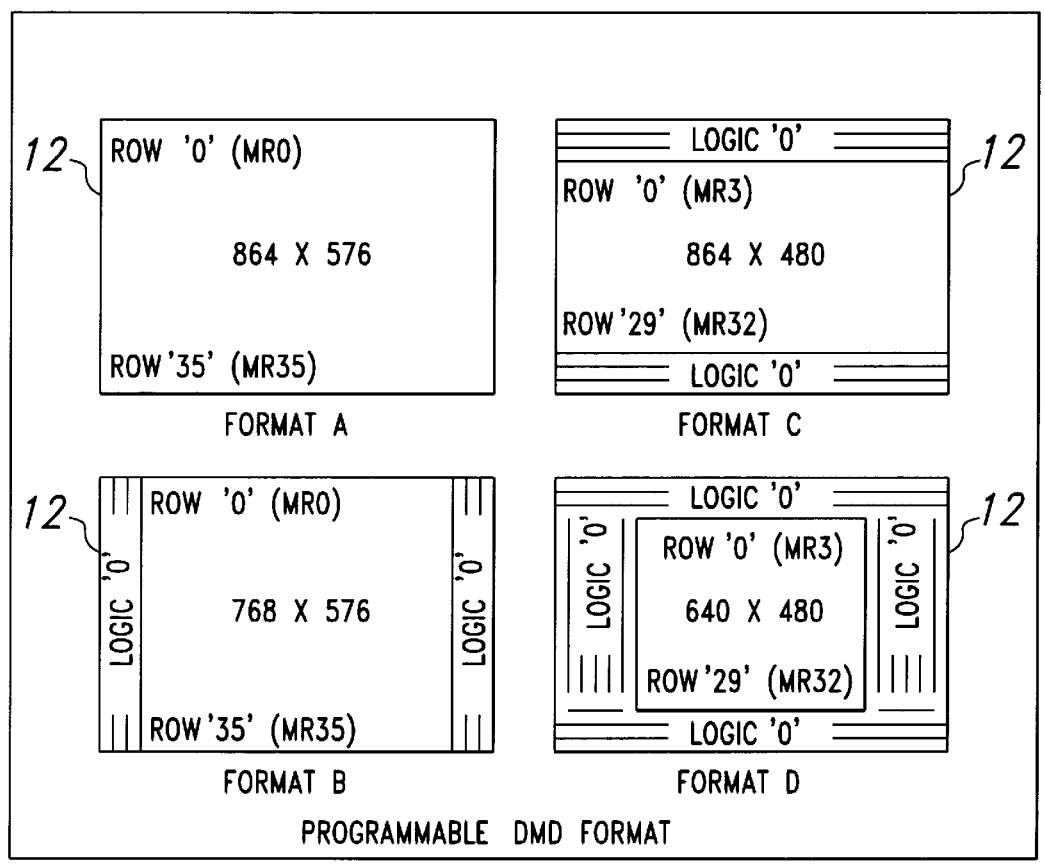
FIG. 2 is a diagram of four pixel array formats which can be realized by the programmable pixel array.

Referring to FIG. 2, mirror array 12 can be seen to be implemented as a full 864×576 pixel array (format A), as a 768×576 pixel array (format B), as a 864×480 pixel array (format C), or as a 640×480 pixel array (format D). Referring to Table 1, the data input pins (D0–D53) implemented, the address input pins (A0–A5) implemented, the rows of memory cells implemented (MR0–MR35), and the logic of the VSIZE logic input are shown as a function of the selected format A, B, C or D. All inputs D0–D53 have a large pull-down register (not shown) to pull the associated inputs to ground when not used, thus automatically loading a logic 0 into the associated columns of memory cells.

TABLE 1

| FORMAT | ARRAY | DATA INPUT | ADDRESS INPUT | VSIZE | MEMORY ROWS |
|---|---|---|---|---|---|
| A | 864 × 576 | D0,D1,D2 ... D50,D51,D52,D53 | A0,A1,A2,A3,A4,A5 | LOW | MR0–MR35 |
| B | 768 × 576 | D3,D4,D5 ... D47,D48,D49,D50 | A0,A1,A2,A3,A4,A5 | LOW | MR0–MR35 |
| C | 864 × 480 | D0,D1,D2 ... D50,D51,D52,D53 | A0,A1,A2,A3,A4 | HIGH | MR3–MR32 |
| D | 640 × 480 | D7,D8,D9 ... D43,D44,D45,D46 | A0,A1,A2,A3,A4 | HIGH | MR3–MR32 |

These various formats and the configuration of the hardware programmable control circuitry which supports these on-chip features will be discussed in greater detail shortly.

Figure 3:
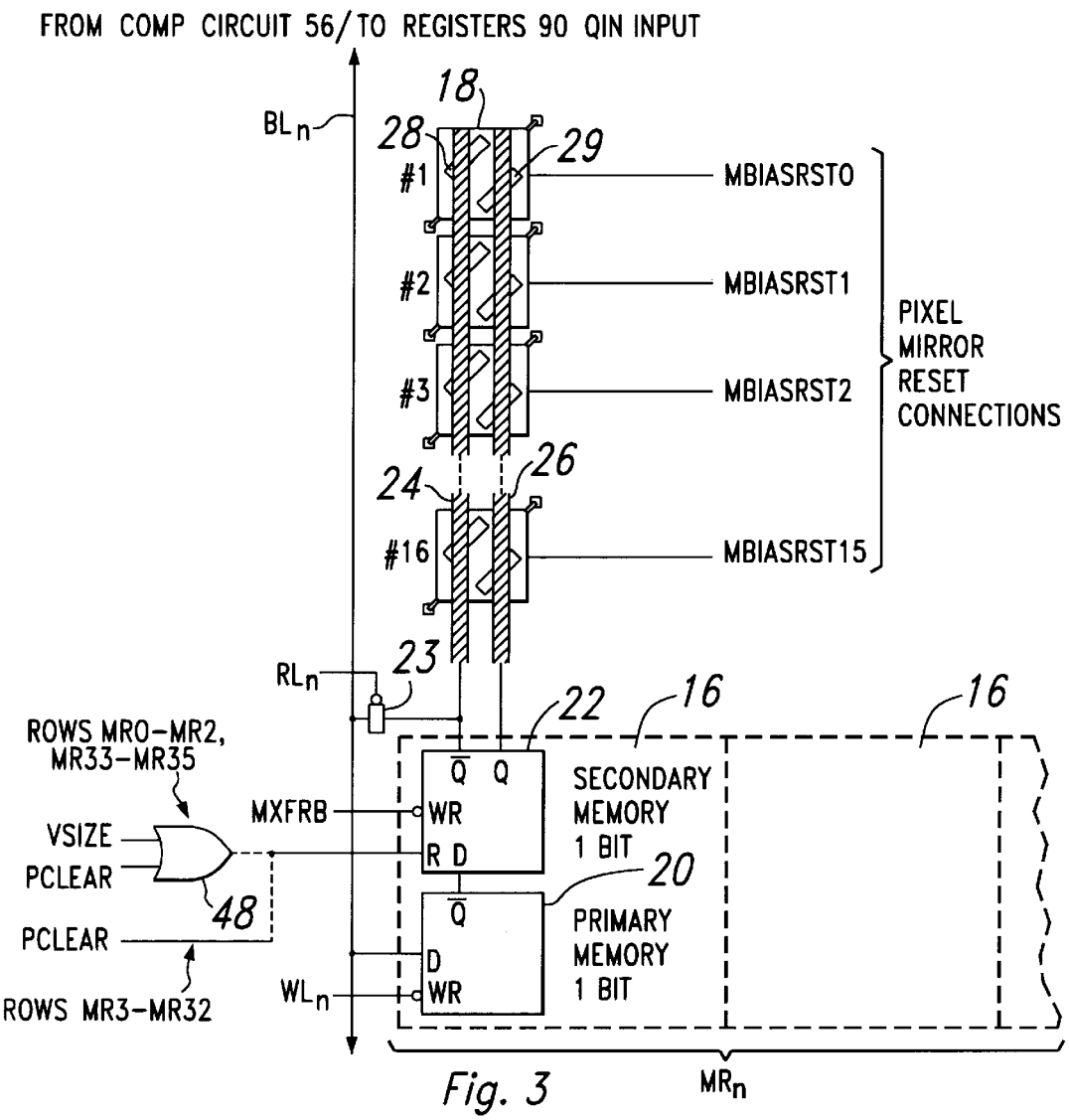
FIG. 3 is a schematic diagram of a portion of the memory cell array architecture which controls positioning of the array pixel mirrors forming the array.

Referring now to FIGS. 1–3, an overview of device 10 will first be provided, with more a detailed discussion of the control circuitry following thereafter. Mirror array 12 comprises an 864×576 DMD mirror array, this array being monolithically fabricated over an 864×36 memory cell array 14. Referring to FIG. 3, each memory cell 16 of the thirty six (36) memory cell rows (MR0–MR35) forming memory array 14 is seen to be associated with and controlling a dedicated group of sixteen (16) pixel mirrors 18. Each memory cell 16 comprises a primary one-bit static random access memory (SRAM) cell 20, and a secondary one-bit SRAM cell 22 fed by the primary cell 20. Each memory cell 16 in a column is connected to a dedicated bit line $BL_n$.

There are 864 bit lines BL0–BL863 connected to one of each of the 864 columns of memory cells 16. Column pixel data is loaded into the addressed primary memory cell 20 of a row $MR_n$ via the associated bit line $BL_n$. The primary memory cell is addressed by enabling the associated row write enable line, identified as the $WL_n$ control line, whereby $WL_n$ is connected to the enable input WR of each primary cell 20 in the row $MR_n$. This pixel data is latched from the primary cell 20 into the respective secondary cell 22 by enabling the global control line MXFRB, the MXFRB line being connected to the enable input WR of all secondary cells 22 of array 14. Secondary memory cell 22 essentially operates as a shadow latch whereby data can be loaded from the primary memory cell 20 into the secondary memory cell 22, allowing the primary memory cell 20 to then be subsequently reloaded with new pixel data without affecting the memory contents of secondary memory cell 22.

The data of secondary memory cell 22 is provided to a pair of complimentary address electrode etches 24 and 26, which in turn are connected to each of the respective address electrodes 28 and 29 for the sixteen pixel mirrors 18 associated with this memory cell 16. The position of each pixel mirror 18 is individually set by providing a reset pulse to the respective bias reset line, identified as MBIASRST 0–15. Essentially, only one pixel mirror 18 of the set of sixteen pixels is addressed at any one time according to the secondary cell 22 contents by providing a bias voltage (reset pulse) to the respective MBIASRST line. This technique is known as memory multiplexing, and is also referred to as the split reset technique. For additional discussions of this memory multiplexing scheme, cross reference is made to co-pending patent application Ser. No. 08/002,627 filed Jan. 8, 1993, and entitled "Pixel Control Circuitry for Spatial Light Modulator", this application is being assigned to the same assignee as the present invention, and the teaching included herein by reference.

By time multiplexing memory cell 16 to a group of sixteen mirrors 18, a total of only 31,104 memory cells 16 are necessary to control the 497,664 pixel mirrors 18. As shown, one read control line $RL_n$ and one write control line $WL_n$ is provided per memory cell row MRn, and one bi-directional column data line $BL_n$ is provided per memory cell column to load data to or retrieve data from a memory cell 16. Thus, the group of sixteen mirrors 18 can be efficiently controlled with a minimum number of control logic lines. The shadow latch 22 of all memory cells 16 is reset by providing a logic "1" to the PCLEAR logic line connected to each cell 22 input R. In the case of memory cell rows MR0–MR2 and MR33–MR35, an OR gate 48 is connected to the shadow latch 22 reset R line. A logic "1" on the VSIZE input will automatically reset the secondary memory cells 22 of rows MR0–MR2 and MR33–MR35 to realize formats C and D.

Referring back to FIG. 1, mirror array 12 just described is controlled by memory array 14, whereby memory array 14 is controlled by a programmable row addressing circuit generally shown at 30, and a programmable column data loading/unloading circuit 32. Row addressing circuit 30 selectively addresses either 30 or 36 rows of memory cells 16 as a function of the VSIZE input, depending on whether 576 or 480 pixel mirror lines are to be implemented (FIG. 2). When formats C and D are selected, a logic "0" is written to all the memory cells 16 in rows MR0–MR2 and MR33–MR35, and data is written only to the memory cells of rows MR3–MR32 which is a total of 30 rows. This selection is controlled in hardware by simply establishing a logic "1" on logic line VSIZE (see FIG. 3), which in turn is connected to OR gates 48. When the VSIZE line is a logic "0", all 36 rows of memory cells 16 are written to, as set forth in Table 1.

Figure 15:
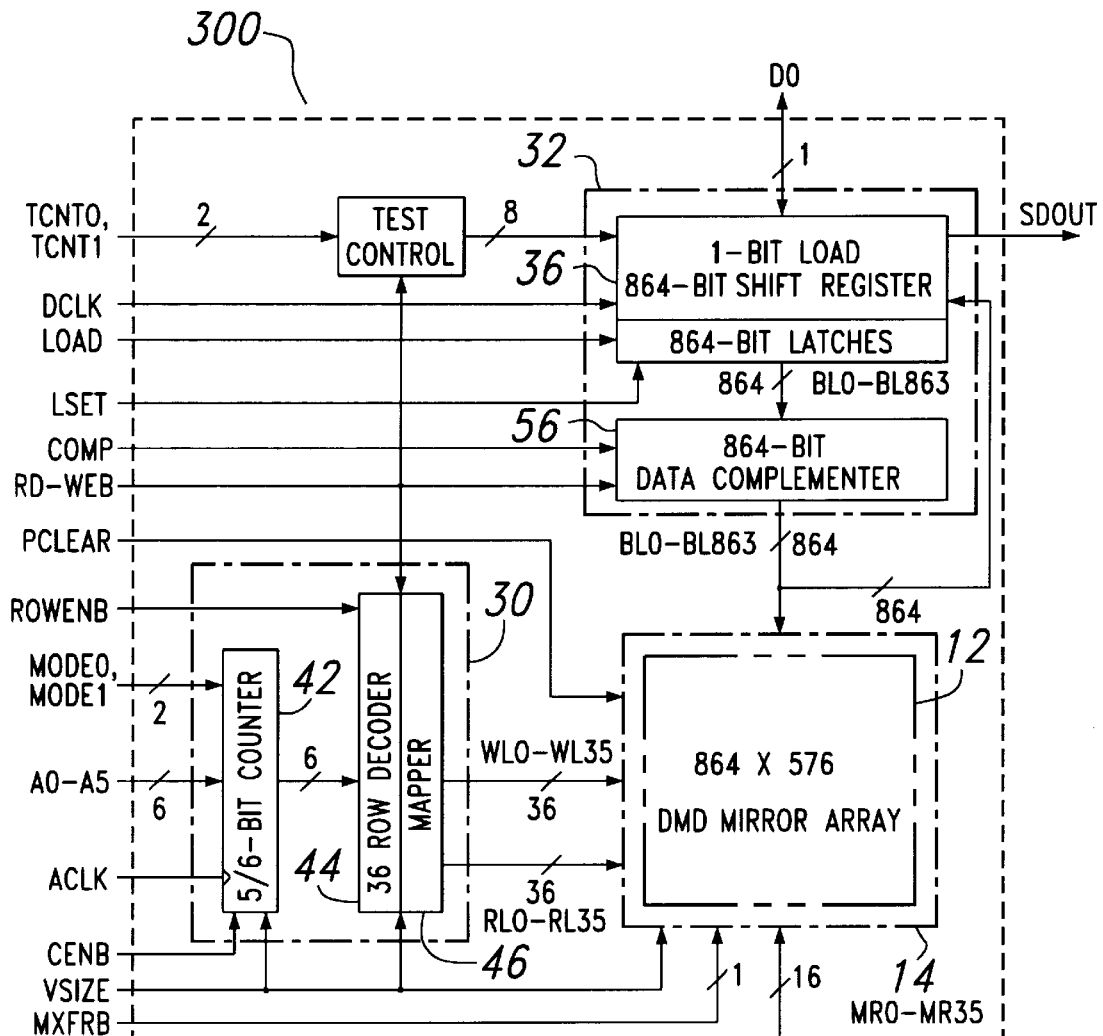
FIG. 15 is a block diagram of yet another alternative preferred embodiment of the present invention with the shift register circuit configured as a single 864-bit serial shift register, whereby only one data input line is used to receive pixel column data.

The column data loading/unloading circuit 32 is also programmable in hardware. Column circuit 32 accepts column pixel data from up to 54 parallel input data lines identified as D0–D53. Column circuit 32 comprises a selectively partitionable 864-bit shift register 36 and data complimenter circuit 56, this shift register in turn providing/receiving column pixel data to/from the 864×36 memory array 14. Shift register 36 can be partitioned by test logic circuit 38 as fifty four (54) 16-bit shift registers (FIG. 1), as twenty seven (27) 32-bit shift registers (FIG. 13), or as a single 864-bit shift register (FIG. 15) as a function of control signals TCNT0, TCNT1 and RD-WEB. In the embodiment of FIG. 1, pixel data is accepted from all 54 data input lines D0–D53. In the alternative embodiment of FIG. 13, pixel data is accepted only on the even input lines, namely, D0, D2, . . . D52, for a total of 27 input lines. In the embodiment of FIG. 15, pixel data is accepted only on one input line, D0. These two alternative embodiments will be discussed further shortly.

Referring back to Table 1, it can be seen that to control array 12 as Format A, pixel data is input on all data input lines D0–D53 by a data formatter (not shown). If Format B is chosen, then pixel data is provided to partitionable shift register 36 only on input lines D3–D50. Input lines D0–D2 and D51–D53 are not implemented, and are pulled to ground by an associated large pull-down register (not shown). For Format C, all data input lines are implemented. To operate as Format D, data is input only on lines D7–D46, whereby data input lines D0–D6 and D47–D53 are not used.

Now, row address circuit 30 will be discussed in further detail. Referring back to FIG. 1, row address circuit 30 determines which of the 36 rows of MR0–MR35 memory cells 16 will be loaded with the incoming pixel column data provided to column data loading/unloading circuit 32. Row address lines A0–A5 are the binary inputs to row address circuit 30. To operate a display according to Format A and B, or Format C and Format D, a custom 5/6-bit counter 42 in combination with a thirty six (36) row decoder 44 and a mapper 46 are provided. Counter circuit 42 will sequentially count between logic 0 and logic 29, or between logic 0 and logic 35 as a function of the input on the VSIZE line to provide the selected format, with the count provided to output lines Q0–Q5. As depicted in Table 2 and referring to FIG. 4, the starting count address is loaded into counter 42 by providing the appropriate address on input lines A0–A5, while providing a logic "0" on the counter enable line CENB and control lines MODE 0 and MODE 1.

TABLE 2

| CENB | MODE1 | MODE0 | FUNCTION |
|------|-------|-------|----------|
| 0 | 0 | 0 | LOAD |
| 0 | 0 | 1 | COUNT UP |
| 0 | 1 | 0 | COUNT DOWN |
| 0 | 1 | 1 | RESET |
| 1 | X | X | HOLD |
| 1 | X | X | HOLD |

For instance, an address of 000010 will correspond to count logic 2. The counter 42 is controlled to count up, count down, reset, or hold at its current count when clocked on the ACLK line as a function of these three inputs, as shown graphically in FIG. 4. In the preferred embodiment, the counter is configured to incrementally count up in both the write and read modes of operation, but can be selectively addressed for diagnostic testing of device 10.

Row decoder circuit 44 decodes the 6 address lines Q0–Q5 provided thereto from counter 42, whereby mapper 46 maps this decoded output of decoder 44 to read lines RL0–RL35 and write lines WL0–WL35 as a function of the VSIZE input. By way of illustration, if a logic "0" is provided on the VSIZE input, decoder 44 in combination with mapper 46 will address a particular row of thirty six rows of memory cells 16, as function of the RD-WEB line. If either of Formats A or B are selected, with the VSIZE line having a logic "0", an address from counter 42 of 000000 will be mapped out by decoder 44 and mapper 46 to enable the first row of the memory cells, MR0, whereby column pixel data can be loaded/unloaded to/from this row of memory cells, as will be discussed shortly. However, if a logic "1" is provided on the VSIZE input line, a logic 000000 from counter 42 will be mapped out by decoder 44 and mapper 46 to provide a row enable to the 4th row of memory cells 16, MR3, referred now to as row 0 in Formats C and D. The write line or read line enabled corresponds to the input on read/write line RD-WEB.

If a logic 011101 (binary 29) is provided by counter 42 to decoder 44, mapper 46 will provide a row enable to thirtieth row of memory cells, MR29, if VSIZE is a logic "0", but to the thirty-fourth row of memory cells, MR33, if VSIZE is a logic "1". Addresses of binary 30 through binary 35 are only valid if VSIZE is a logic "0". Therefore, it can be seen that row decoder 44 in combination with mapper 46 will decode the 6 input signals (count) from counter 42 and enable a row of memory cells 16 as a function of the count and as a function of the VSIZE input. This custom designed row address control circuit 30 thus provides the ability to sequentially write to a middle subset of memory cell rows, labeled as rows ROW0–ROW29 as depicted in Format C and Format D of FIG. 2. This option is provided in hardware, and only necessitates that the single control line VSIZE be addressed.

When the VSIZE input is a logic "0", 36 clock pulses to the ACLK line are necessary before counter 42 returns to the same count position. When a logic "1" is provided to the VSIZE input line, only 30 clock pulses to the ACLK line are required before counter 42 returns to the same count position. In the preferred embodiment, counter 42 is initially loaded to count 0 by providing a logic "0" to all address lines A0–A5, while providing a logic "0" to control lines MODE 0 and MODE 1, and a logic "0" to the counter enable CENB line (see Table 2). Thereafter, a logic "1" is provided to the MODE 0 line such that counter 42 is in the count "up" mode. Accordingly, the rows of memory cells 16 will be sequentially addressed with the ACLK pulse from row 0 to row 35 (R0–R35), or from row 0 to row 29 (R3–R32), depending on the logic state of the VSIZE input line, but with rows 0 through 29 actually being the 4th through thirty-third rows of memory cells 16 as shown in FIG. 2.

With this description of the row address circuit 30 having been provided, attention will now be directed to the loading and unloading of column pixel data into/out of memory array 14 via the partitionable shift register circuit 36.

Figure 5:
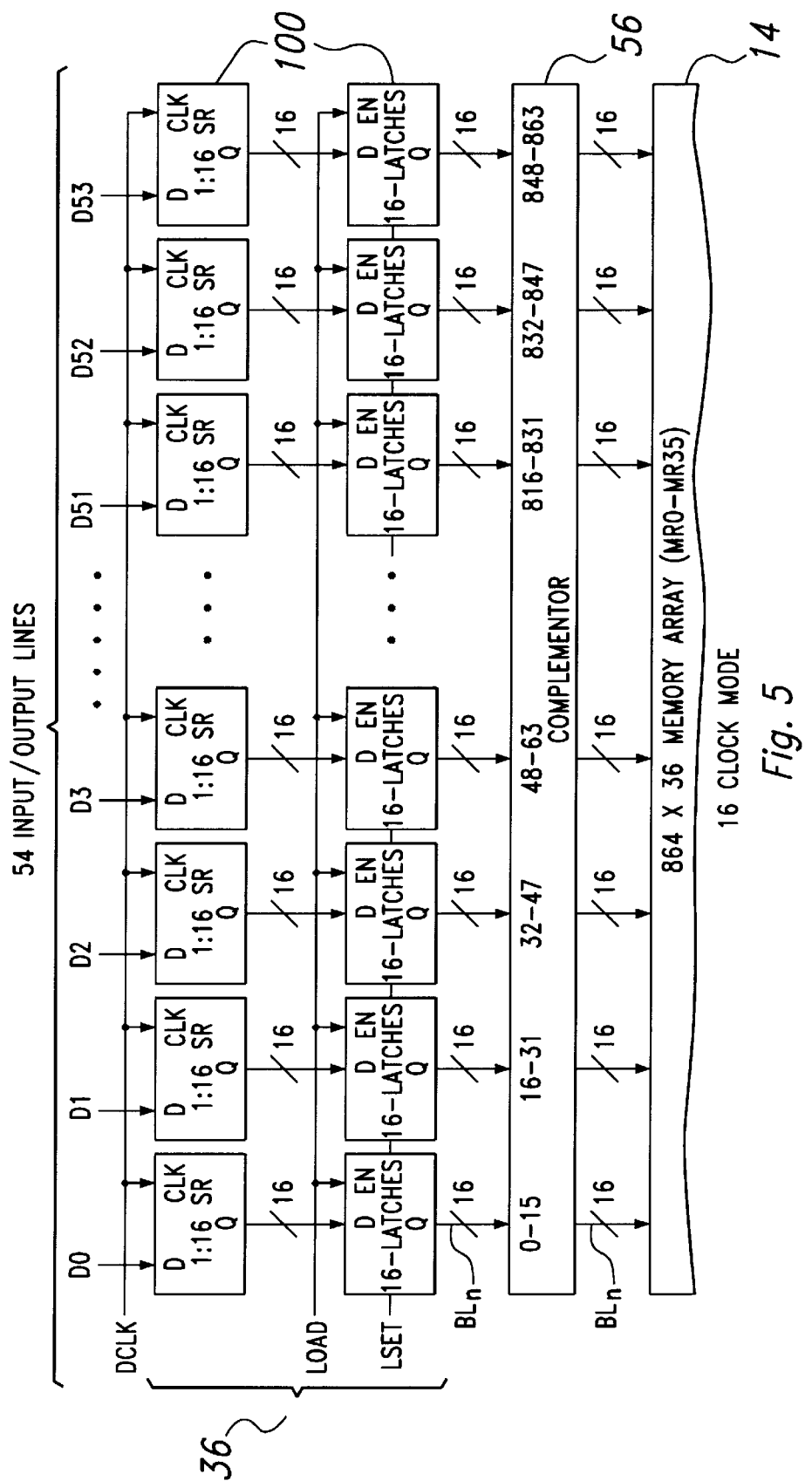
FIG. 5 is a block diagram of the programmable partitionable shift register implemented for loading pixel data into the array columns, the shift register circuit being shown partitioned as fifty four (54) 16-bit shift registers with associated 16-bit latches.

Referring to FIG. 5, a simplified block diagram of shift register 36 as implemented in the preferred embodiment of FIG. 1 is shown. Partitionable shift register 36 is seen to comprise of fifty four (54) 16-bit serial shift registers 100. Shift register 36 can also be reconfigured as twenty seven (27) 32-bit shift registers, or, as a single 864-bit shift register for the alternative preferred embodiments of FIG. 13 and FIG. 15, respectively. This selective partitioning feature will be described in more detail shortly. For the embodiment shown in FIG. 1, shift register circuit 36 is functionally partitioned into fifty four (54) 16-bit shift registers.

Each shift register 100 can be seen to have its D input connected to one of the data input lines D0–D53, and having 16 parallel outputs Q. Each shift register 100 is also seen to have a clock input identified as CLK connected to the input line DCLK Sixteen (16) clock pulses are provided to the DCLK line to shift 16 bits of pixel data into each register from the respective D input line. After 16 clock pulses, each of the fifty four (54) 16-bit shift registers 100 are fully loaded with pixel data, thus, a total of 864 bits of pixel data will have been loaded into the shift registers of register 36. If any input lines are unused, they are pulled-low by a pull down register (not shown), and thus, a logic "0" is loaded into the associated shift registers 100.

Each of the shift registers 100 are seen to include an integral 16-bit parallel latch. The 16 bits of data in shift register 100 are latched into the corresponding 16-bit latch upon providing a logic "0" on the load logic line, identified as LOAD. Upon loading the pixel data into the parallel latches, this data will be provided in parallel on bit lines BL0–BL863 to the cells 20 and 22 of the memory array 14 (see FIG. 3), via a 864-bit data complimenter 56. (See FIG. 12). Data complimenter 56 passes the 864 bits of pixel data as true (uninverted) when logic line COMP is provided with the logic "0", but inverts the data when a logic "1" is provided on the COMP logic line. The data complimenter 56 also permits all 0's or all 1's to be loaded line-by-line into the memory array 14 during a test procedure, as will be discussed shortly.

Referring back to FIG. 3, the pixel data provided from registers/latches 100 on bit lines $BL_n$ are coupled to the memory cells 16. The pixel data provided on bit lines $BL_n$ will be latched into the row of primary memory cells 20 addressed by mapper circuit 46, shown in FIG. 1, by providing a logic "0" to the write line WEB. That is to say, pixel data is latched into the row of memory cells 16 only one row at a time, and as addressed by mapper 46. After the pixel data has been latched from the first memory cell 20 into the shadow or second memory cell 22 by providing a logic "1" on the MXFRB line, column pixel data can again be loaded into the shift registers 100 for the next row of primary memory cells 20 to be written to, without effecting the contents of the previously latched row of second memory cells 22.

In summary, column pixel data is loaded from data lines D0–D53 into the respective shift registers 100 by providing 16 clock pulses on line DCLK, then latched into the corresponding parallel latches by enabling the LOAD line, written into the selected (addressed) row of first memory cells 20 by enabling the write line WEB, and then latched into the corresponding second memory cells 22 using the MXFRB line. This process repeated for the next row of memory cells addressed. As will be discussed shortly, the memory contents of the secondary cells 22 can be read by unloading row-by-row back into the MUXED input of shift registers 100, and then unloaded therefrom, with the shift registers 100 being configured as fifty four (54) 16-bit registers, twenty seven (27) 32-bit registers, or a single 864-bit register as will be discussed shortly.

Referring now to FIGS. 4 and 6–8, a more detailed description of the operation and architecture of row address circuit 30 will be provided. First referring to FIG. 4, an illustrative timing diagram depicting the operation of the 5/6-bit counter 42 is shown. The operation of counter 42 can be seen to be a function of several inputs, namely, ACLK, MODE 0, MODE 1, and CENB. Referring back to Table 2, the mode of counter 42 can be seen in table form as a function of the three principal inputs, whereby FIG. 4 graphically illustrates the counter mode of operation as a function of the ACLK, the address on the 6 address lines A0–A5, and depicting the count Q as a function of these parameters.

Figure 4:
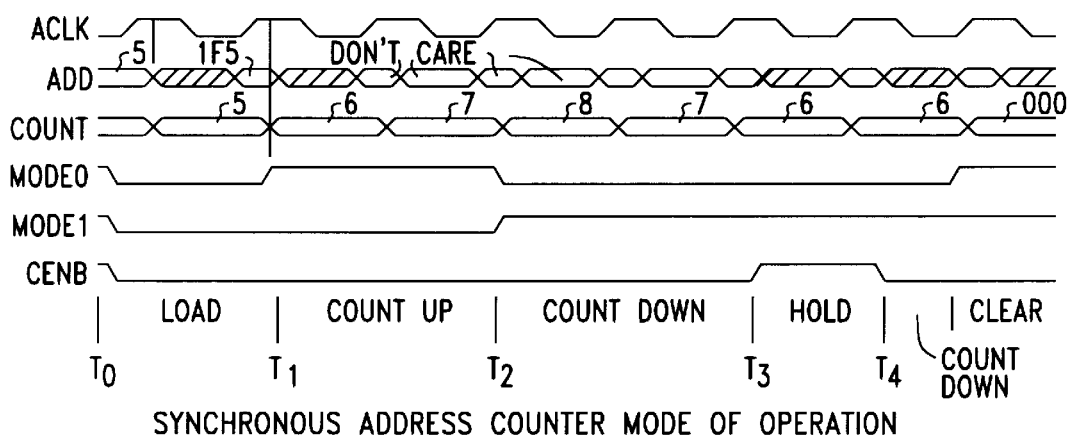
FIG. 4 is a timing diagram of the synchronous address counter mode of operation for the row address circuitry.

Viewing FIG. 4 from left to right, it can be seen at time $T_0$ that with MODE 0 and MODE 1 having a logic "0" input, the address lines A0–A5 provided with a binary address of 5 (000101), and with the chip enable line CENB having a logic "0", the address will be loaded into the count Q upon the rising edge of a clock on the ACLK input. At time $T_1$, the MODE 0 input now has a logic "1". Referring to Table 2, counter 42 will now count up at the rising edge of each ACLK pulse. As graphically illustrated, the second, third and fourth ACLK pulse increments the count Q from 5 to 8.

Now, at time $T_2$, the MODE 0 input is now provided with the logic "0", and the MODE 1 input provided with a logic "1". Referring to Table 2, counter 42 is now in the count "down" mode. For the next two ACLK pulses, the count Q will decrement from 8 to 6.

At time $T_3$, the count enable input CENB is provided with a logic "1", and by referring to Table 2, it can be seen that counter 42 will be in the "hold" mode. That is, any subsequent changes to the MODE 0 or MODE 1 inputs, the address inputs A0–A5, and subsequent pulses to the ACLK, will be ignored by the counter, and the count Q will maintain a count of 6. Lastly, at time $T_4$, it can be seen that the MODE 0 and the MODE 1 lines are both provided with the logic "1". With the count enable line CENB having a logic "0", the count Q will be reset to 0 upon the rising edge of the ACLK pulse.

Figure 6:
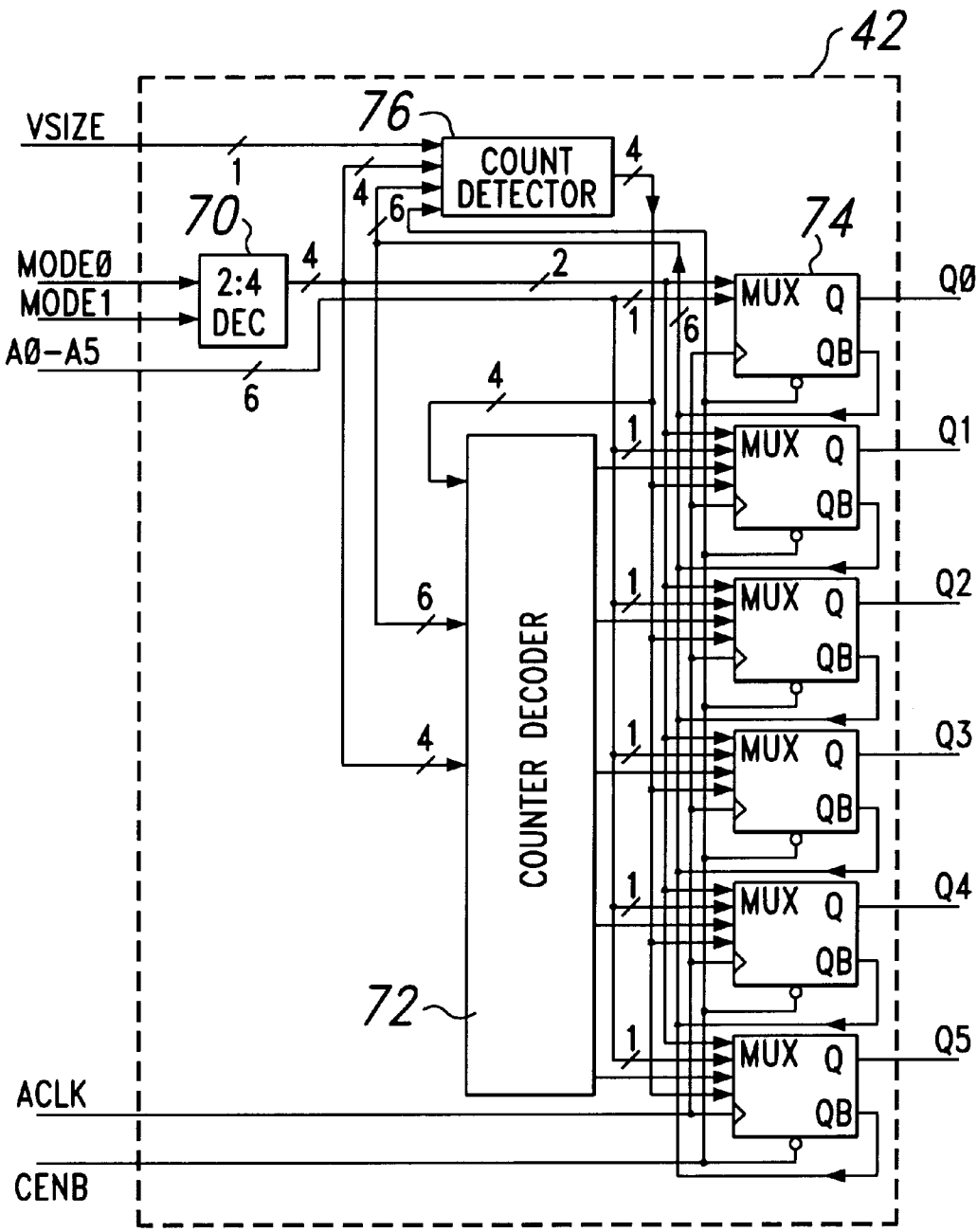
FIG. 6 is a schematic-block diagram of the controllable 5/6-bit counter of the row decoder circuit.
Figure 7:
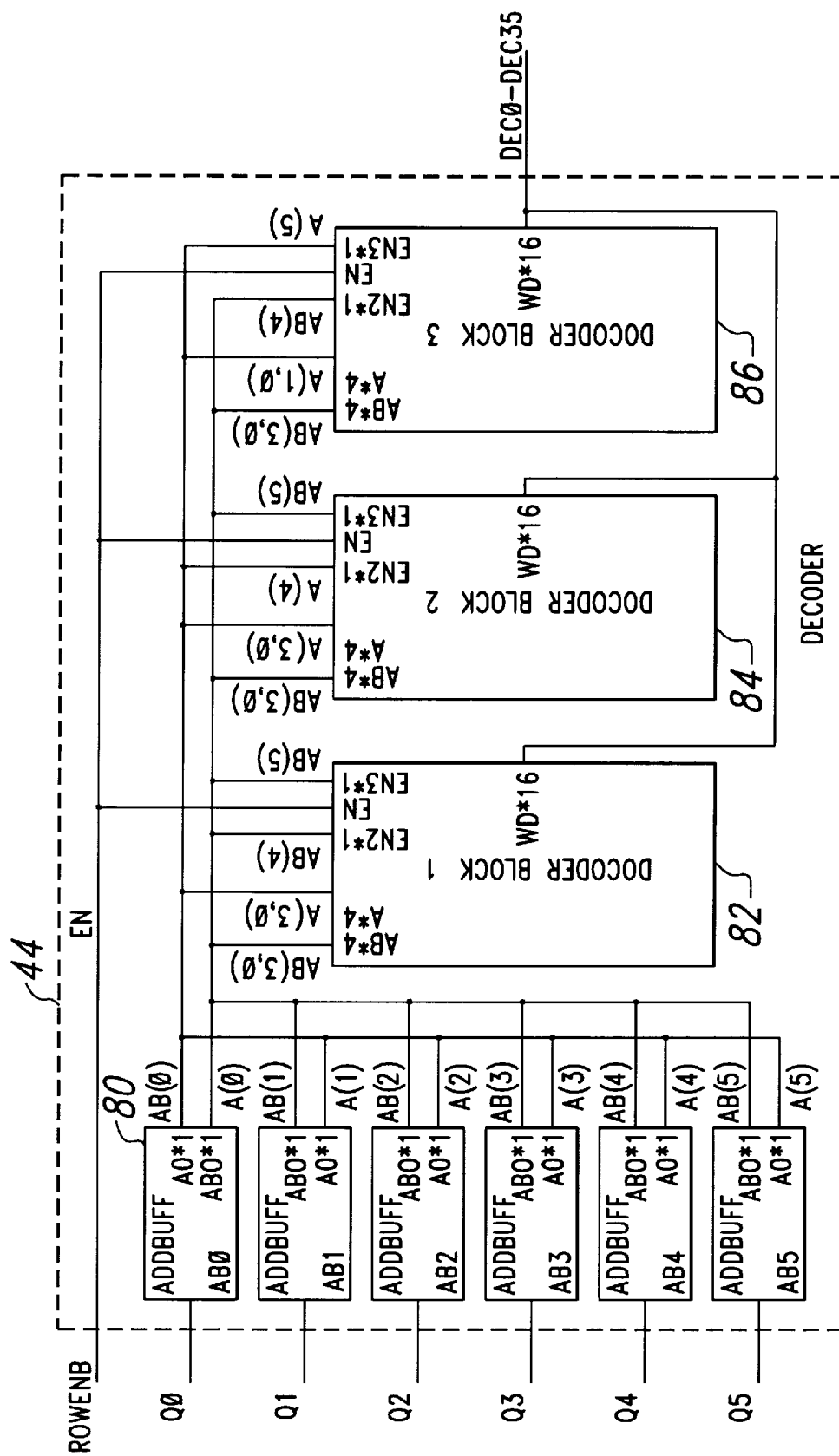
FIG. 7 is a schematic-block diagram of the row decoder circuit which decodes address signals from the 5/6-bit counter as a function of the array VSIZE input signal.
Figure 8:
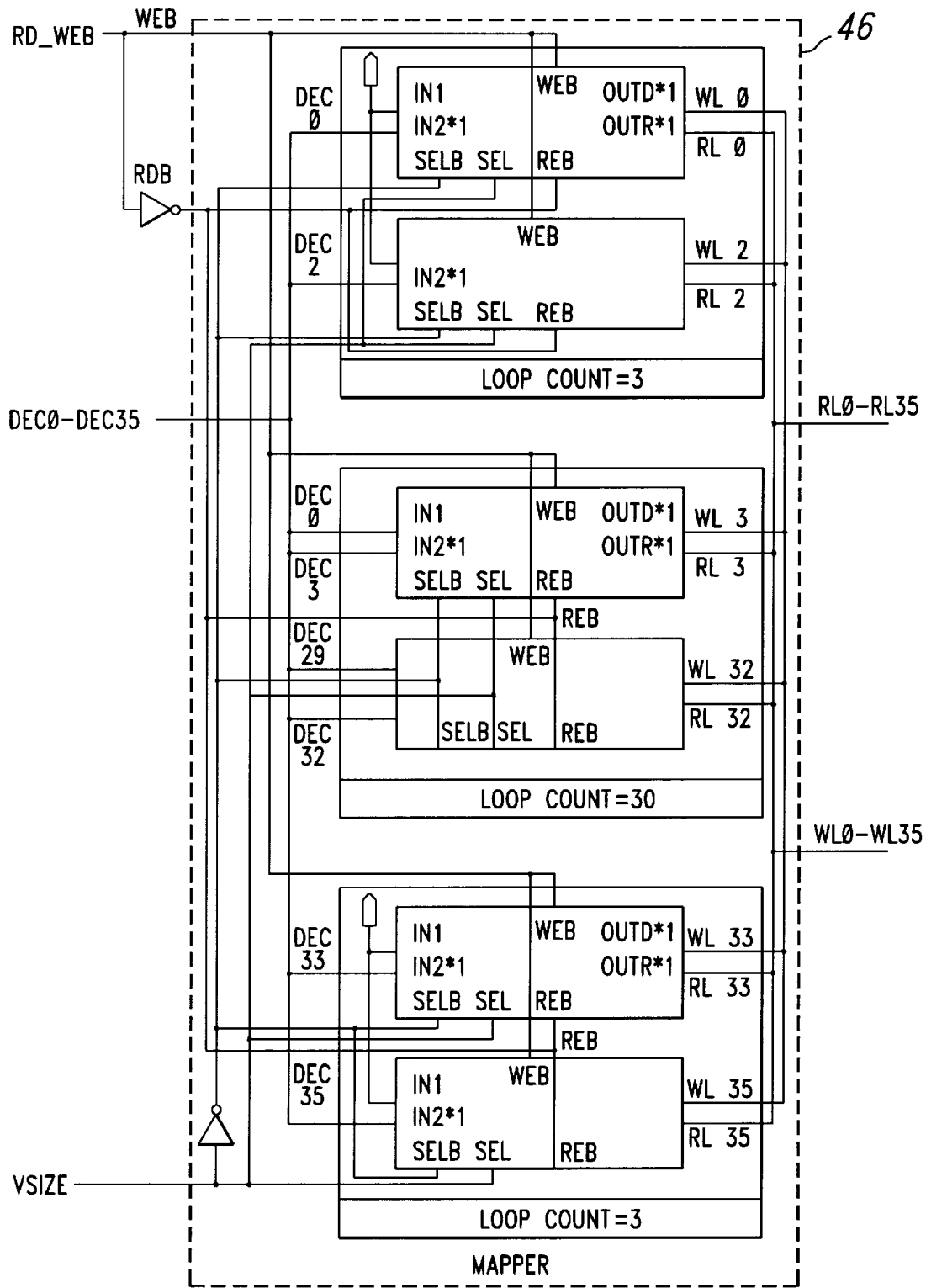
FIG. 8 is a schematic-block diagram of the mapper circuit which addresses the rows of memory cells as a function of the VSIZE input and the decoded address.

Referring now to FIGS. 6–8, a detailed discussion of the row address circuitry architecture will be provided. As previously mentioned, counter 42 is selectively configurable as a 5 or 6-bit counter, as a function of the VSIZE input. If the VSIZE input is a logic "0", counter 42 is configured as a 6-bit counter with a maximum count of 36 (binary 35). Conversely, if the VSIZE input has a logic "1", counter 42 is configured as a 5-bit counter with a maximum count of 30 (binary 29). This count is provided to row decoder circuit 44, which decodes this 6 bit input to address one of 36 rows of memory cells MR0–MR35. Decoder 44 operates in conjunction with mapper 46, wherein mapper 46 only writes to memory cell rows MR0–MR2 and MR33–MR35 when the VSIZE input is a logic "0", to obtain the DMD Formats A and B shown in FIG. 2.

Referring first to FIG. 6, a block diagram of counter 42 is shown. Counter 42 is comprised of a 2-bit decoder 70, a 6-bit counter decoder 72, six MUXED D-flip flops 74, and a count detector 76. Logic inputs MODE 0 and MODE 1 are connected to decoder 70, with the outputs of this decoder 70 feeding the inputs of count detector 76, counter decoder 72, and flip flops 74. The VSIZE input is connected to count detector 76, and the six address lines A0–A5 are connected to the respective D flip flops 74, as shown. The clock input ACLK is connected to each of the D flip flops 74, as is the chip enable line CENB. A discussion of the operation of this counter is as follows.

Counter 42 is a 6-bit loadable, clearable, up/down counter, controlled by MODE0, MODE1, CENB, VSIZE and ACLK. CENB is used to inhibit counting when in the count mode. CENB has no effect when in the load or clear mode. VSIZE is used to select either 30 or 36 count.

When VSIZE is a logic "1", the counter 42 is in the count 30 mode. The counter roll-over is from 29 to 0 in the count-up mode, and from 0 to 29 in the count-down mode. When VSIZE is a logic "0", the counter is set to count in the count 36 mode and the counter roll-over is from 35 to 0 in the up count and from 0 to 35 in the down count mode. The count detector block 76 controls the roll-over operations by detecting the QB output of the D flip-flops 74. Count detector block 76 could also be programmed to control roll-over at other counts if desired, such as at count 23 if the middle 24 rows of memory cells MRn are to be implemented. Thus, a plurality of formats can be achieved.

The load mode circuitry (part of the counter decoder 72) allows parallel loading of the cascaded D flip-flops 74. A loading is synchronous, wherein selecting the load mode disables the counter and causes the outputs Q0–Q5 to agree with the data input A0–A5 after the next ACLK pulse.

A value between 36 and 63 can be loaded into the counter, however, the count-up and count-down operations are undefined for these cases by the count detector circuitry 76.

Referring now to FIG. 7, a detailed discussion of the row decoder 44 will be described in considerable detail. Decoder circuit 44 can be seen to have six address inputs Q0–Q5 provided to six add buffers 80, which inputs are received from the output of the 5/6-bit counter 42 as shown in FIG. 6. Decoder circuit 44 is principally comprised of the six add buffers 80, a first decoder block illustrated at 82, a second decoder block illustrated at 84, and a third decoder block illustrated at 86, each receiving inputs from the add buffers 80. The decoder enable line EN is connected to each of these three decoder blocks 82, 84 and 86, with these decoder blocks operating when a logic "0" is provided on the row enable line ROWENB. This ROWENB line is provided with the logic "0" during both the read and write operation of the 864×36 memory array 14. Decoder 44 provides a logic "1" to one of thirty six output lines DEC0–DEC35, as a function of the address on lines A0–A5.

The decoder 44 is basically a 36-line binary select decoder. Enabling input EN causes selecting one of thirty-six output lines. Table 3 below shows the function of the 36 line decoder 44.

TABLE 3

| ENABLE | SELECT INPUT | OUTPUTS DEC |
|---|---|---|
| EN | Q5,Q4,Q3,Q2,Q1,Q0 | 0 1 2 3 . . . 35 36 |
| H | X X X X X X | L L L L . . . L L |
| L | L L L L L L | H L L L . . . L L |
| L | L L L L L H | L H L L . . . L L |
| L | L L L L H L | L L H L . . . L L |
| L | L L L L H H | L L L H . . . L L |
| " | " | " |
| " | " | " |
| " | " | " |
| " | " | " |
| L | H L L L H L | L L L L . . . H L |
| L | H L L L H H | L L L L . . . L H |

Referring now to FIG. 8, a detailed discussion of mapper 46 is provided. Mapper 46 can be seen to have 36 inputs, identified as DEC0–DEC35, these inputs being provided from outputs of decoder blocks 82, 84 and 86 of row decoder circuit 44, as depicted in FIG. 7. Mapper 46 can be seen to have thirty six pairs of write enable lines WL and a read enable lines RL. These pair of lines are connected to respective rows of memory cells 16 MR0–MR35, as shown in FIG. 3. Mapper 46 maps the 36 inputs DEC0–DEC35 to the appropriate thirty six read lines RL0–RL35, and write lines WL0–WL35, as a function of the VSIZE logic input. When a logic "0" is provided to the VSIZE input, the thirty six DEC inputs are mapped directly to the corresponding read line RL and write line WL outputs, as a function of the read/write control lines RD-WEB. That is, a selected logic level is provided to the addressed RL line if a logic "1" is provided to RD-WEB, and another selected logic level is provided to the addressed WL line if a logic "0" is provided to the RD-WEB line.

If the VSIZE input is a logic "1", however, the mapping is not so direct. When the VSIZE input has a logic high "1" input, DEC 0 will be mapped to read line RL3 or write line WL3, as a function of the read/write line RD-WEB. That is to say, when the read/write line RD-WEB has a logic "1", the DEC input will be mapped to the RL output lines. When the read/write enable line RD-WEB has a logic "0", the DEC inputs will be mapped to the write line WL output lines. Input DEC0 will be mapped to the corresponding read line or write line RL3 or WL3, DEC1 being mapped to RL4 or WL4, and so forth, with DEC29 being mapped to RL32 or WL32. Inputs from DEC30–35 will not be generated if VSIZE is a logic "1".

Turning now to the column pixel data loading circuit 32 depicted in FIG. 1, a more detailed discussion of the operation and architecture of this circuit as a function of the control signals provided by test control logic circuit 38 will be provided. Referring to Table 4, a logic table of test control circuit 38 is shown as a function of the test control lines TCNT0 and TCNT1, and the read/write line RD-WEB, with the associated outputs that are generated being shown.

TABLE 4

| RD-WEB | TCNT1 | TCNT0 | FUNCTION | OUTPUTS |
| --- | --- | --- | --- | --- |
| 0 | 0 | 0 | Data Reg Reset | DRSTB |
| 0 | 0 | 1 | Input Data 16-bit Shift (Normal Write Mode) | SEL54 & DSEL |
| 0 | 1 | 0 | Input Data 32-bit Shift (Normal Write Mode) | DSEL |
| 0 | 1 | 1 | 864-Bit Shift (Test Serial Write) | SHSEL |
| 1 | 0 | 0 | Read 16-bit Shift (Test Read Mode) | OUTEN & SHSEL |
| 1 | 0 | 1 | Read 32-bit Shift (Test Read Mode) | OUTEN & SHSEL & OUTEN27 |
| 1 | 1 | 0 | 864 Serial Out (Test Read Mode) | SHSEL |
| 1 | 1 | 1 | Shift Data from Array into Registers | QSEL |

Figure 9:
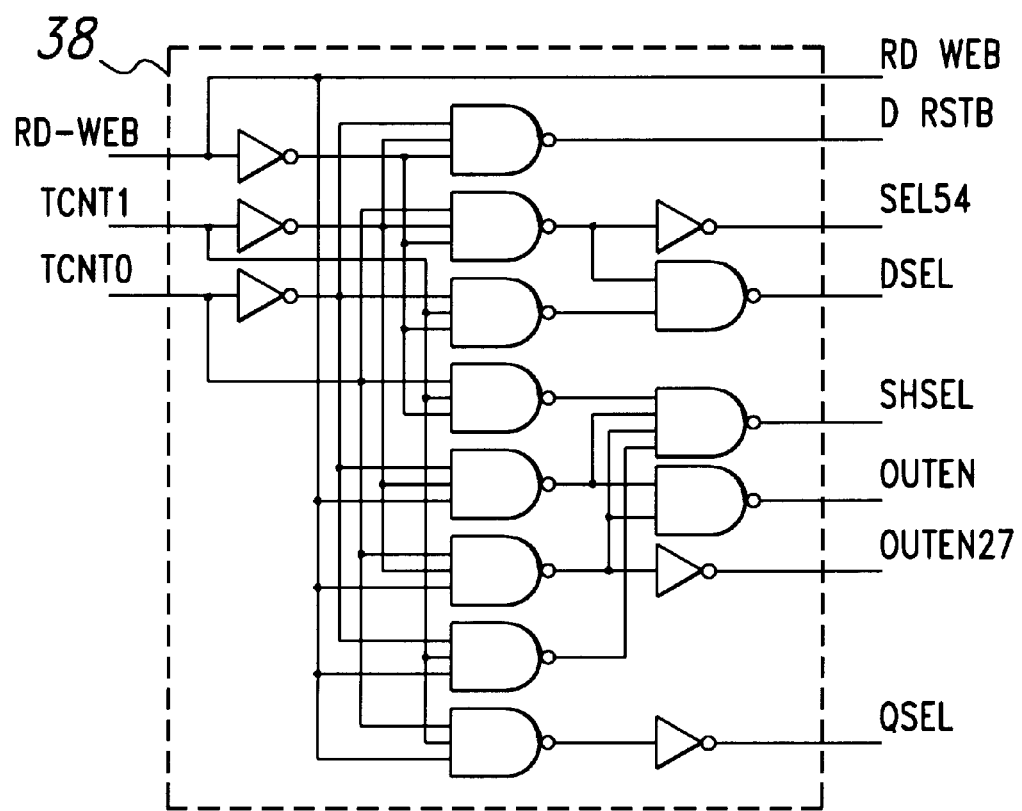
FIG. 9 is a schematic diagram of the control circuit providing the function of Table 3.

A basic schematic diagram of the circuit 38 performing the operation depicted in Table 4 is shown in FIG. 9. This logic circuit is rather straight forward, and comprises an arrangement of various logic gates to provide the logic outputs.

Test control inputs TCNT0 and TCNT1 control whether the shift register 36 will be reset, configured as a series of 16-bit shift registers, configured as a series of 32-bit shift registers, or configured as a single 864-bit shift register, as set forth in Table 4. The read/write line RD-WEB determines whether the column load circuitry 32 will be configured to load column pixel data into memory array 14, or to read out the memory cell contents of memory array 14 for diagnostic testing. To further understand this selectable configuration and the various options of column control circuit 32, a detailed description of partitionable shift register 36 and its associated bit latches will now be provided.

Figure 10:
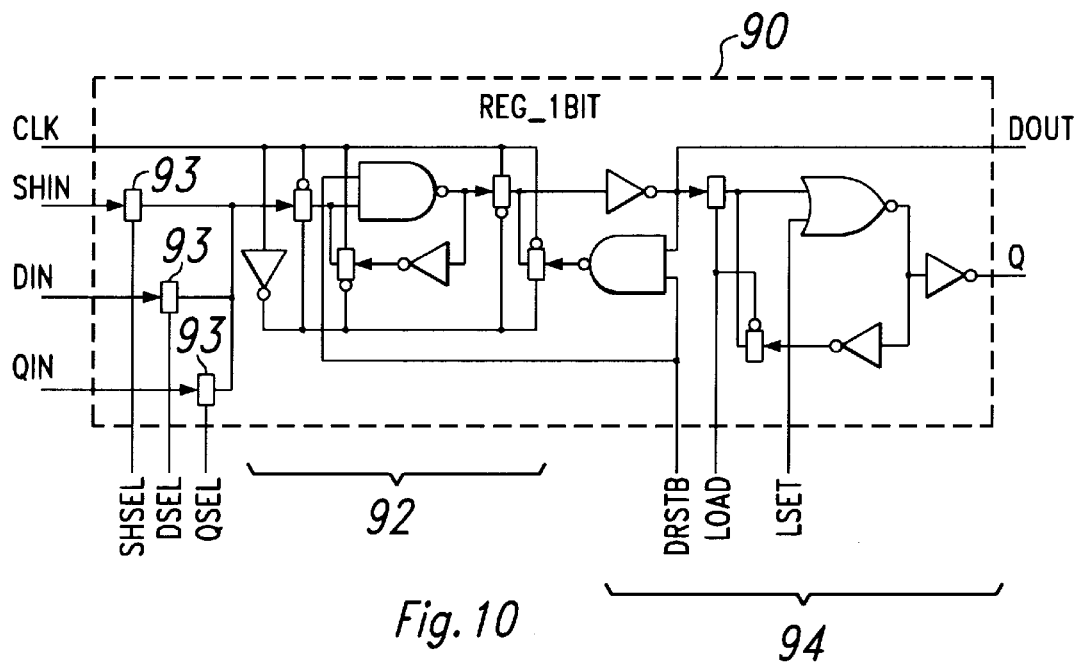
FIG. 10 is a schematic diagram of a one-bit MUXED 3-input shift register forming a subset of the programmable shift register circuit.

Referring now to FIG. 10, one of 864 1-bit shift registers of selectively configurable shift register 36 is shown at 90. Each register 90 is seen to have a MUX input receiving three inputs, namely, a shift input SHIN, a data input DIN, and a Q input QIN. Data on these inputs are selectively shifted into the master register 92 by enabling control lines associated with the input line gates 93, namely, shift select SHSEL, data select DSEL, and Q select QSEL, respectively. The "master" register 92 of the master-slave flip flop is controlled by the system clock CLK. A rising edge of a clock pulse on the CLK line shifts a bit of data from the enabled input to the output DOUT. This shifted data is loaded into a parallel latch 94 by a logic "0" on the LOAD line, after loading all the registers, and output at Q when writing to data to the respective column of the memory cells 16. The parallel latch 94 can be easily loaded with a logic "1" by providing the logic "1" to the LSET logic input. The parallel latch 94 is reset by providing a logic "0" on control line DRSTB.

Referring to FIG. 1 and Table 5, the rows of memory array 14 can also be alternately loaded with a logic "0" or a logic "1" by enabling or disabling the complement input COMP after loading all registers with a logic "1" using line LSET.

TABLE 5

| LSET | COMP | FUNCTION |
| --- | --- | --- |
| 0 | 0 | Transparent Latch Load Data |
| 0 | 1 | Complement Latch Loan Data |
| 1 | 0 | Set Latch Load Data |
| 1 | 1 | Reset Latch Load Data |

In summary, register 90 shifts data from one of the three selected logic inputs to the output DOUT, upon the rising edge of the CLK pulse, and latches the data bit to the Q output when the logic line LOAD is enabled.

Figure 11:
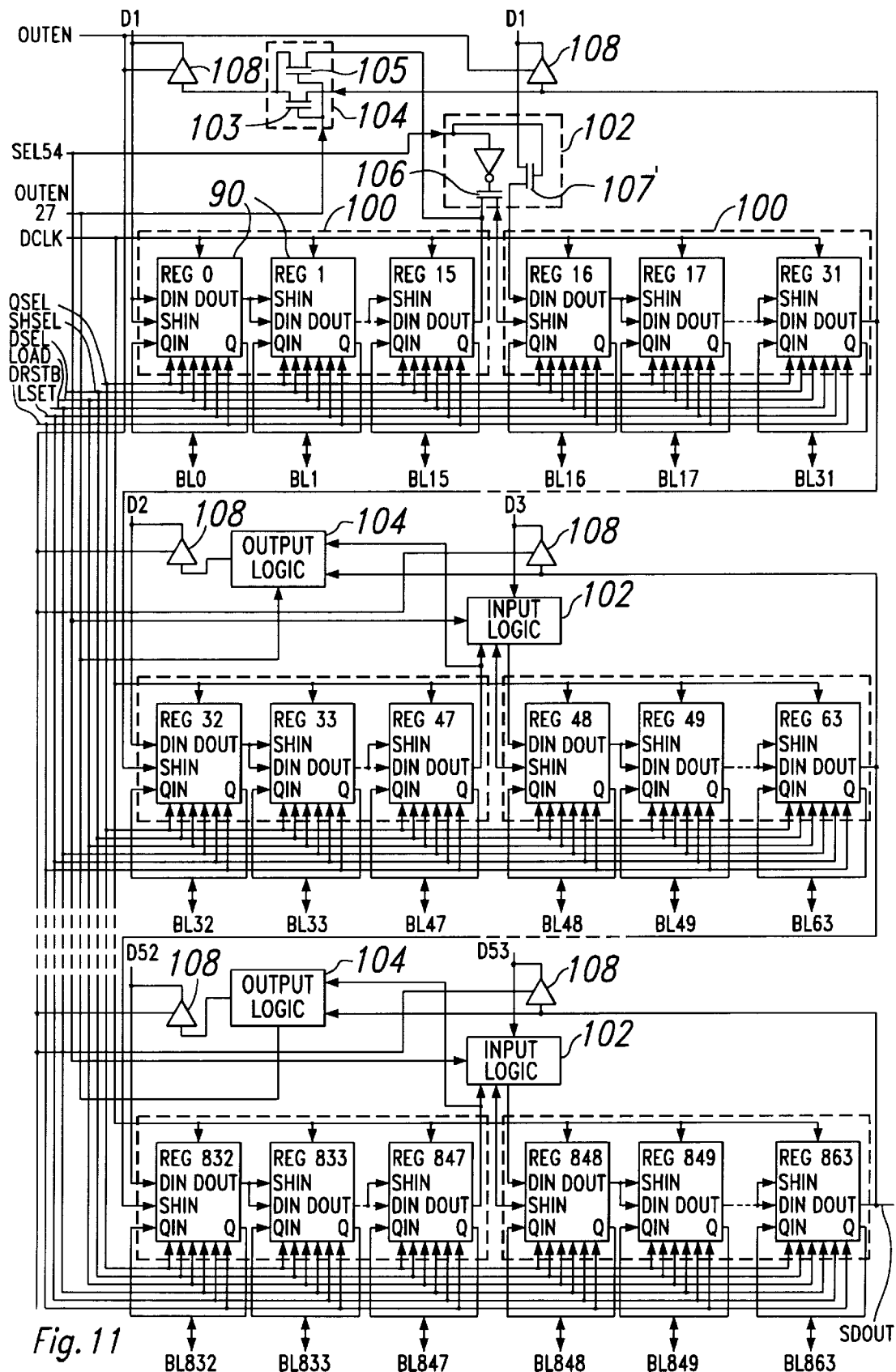
FIG. 11 is a schematic-block diagram of the 864-bit shift register circuit, this circuit being functionally partitionable as fifty four (54) serially connected 16-bit shift registers, or twenty seven (27) 32-bit shift registers, with MUXED inputs.

Referring now to FIG. 11, a detailed block diagram of selectivably configurable shift register 36 is shown. Shift register 36 is seen to be comprised of 864 1-bit serially connected shift registers 90, each with MUXED inputs as depicted in FIG. 10. The unique architecture of this shift register 36 permits the 864 1-bit shift registers 90 to be operationally configured into fifty four (54) 16-bit shift registers shown in phantom at 100.

The D output DOUT of each shift register 90 is connected to the shift input SHIN of the next shift register 90. For the first fifteen registers 90 of every register 100, this D output DOUT is also connected to the D input DIN of the next register, as shown. However, the D output DOUT of the 16th register of alternating registers 100, such as register REG15, REG 47, etc., is connected to a respective logic gate circuit 102 rather than directly to the shift input SHIN of the next register of the adjacent group of registers 100, such as register REG 16, REG 48 etc. Logic circuit 102 is a MUX and connects the D output DOUT from the previous shift register, such as register REG 15, REG 47 etc., and the corresponding odd data input, such as D1, D3, etc., to the shift input SHIN and the D input DIN of the next block of registers 100, respectively, such as that of register REG 16, REG 48 etc. Logic circuit 102 connects these two input lines to the DIN input and SHIN input of the first register 90 of the subsequent register 100 as a function of the logic input SEL54.

As shown in Table 4, with logic input TCNT0 having a logic "1" and logic TCNT1 having a logic "0", shift register 36 will be configured as fifty four (54) 16-bit shift registers. This is because, as depicted in Table 4, the logic line DSEL and SEL54 are enabled. With the logic line DSEL being enabled, each of the shift registers 90 will shift data into the respective register 92 from the MUXED DIN input. Moreover, with the input line SEL54 enabled, each logic circuit 102 will connect the respective data input lines D1, D3, . . . D53 to the D input DIN of respective 16-bit shift registers 100, REG 16, REG 48 . . . REG 848. That is to say, the output from D output DOUT of alternating 16th registers, ie. REG 15, REG 47 . . . REG 847 will not be shifted into the SHIN input of the next block of 16 shift registers, ie. REG. 15, REG 48 . . . REG 848. As will be described shortly, when the logic input TCNT0 has a logic "0", and logic input TCNT1 has a logic "1", line SEL 54 will be a logic "0" and these shift registers 90 will be configured as twenty seven (27) 32-bit shift registers by pairing registers 100, with the data from output DOUT of alternating 16th shift register 90 REG15, REG 47 . . . REG 847, being shifted into the SHIN input of the first shift register of the next block of 16 registers 100 REG 16, REG 48, . . . REG 848. (See FIG. 13).

With the shift registers 90 being operatively configured as fifty four (54) 16-bit shift registers 100, all data input lines D0–D53 are implemented and are coupled to the respective data input DIN of a corresponding register 100, as shown. As will be discussed shortly with reference to timing diagram 17, to sequentially load pixel data into each of the 16 registers of register 100, 16 clock pulses are required on line CLK. After 16 clock pulses, and with the 16 registers of register 100 now being loaded with data, a logic "1" is provided to the LOAD input, which in turn latches the data in each register 92 to the respective Q output. These Q outputs are connected to the respective bit lines BL0–BL863, these bit lines in turn being connected through COMP circuit 56 to the appropriate column driver line BL0–BL863 as depicted in FIG. 3. The data latched on these bit lines BL$_n$ is subsequently loaded into the primary cell 20 of one of the 36 rows of memory cells 16 by a logic "0" provided on the RD-WEB line, with the memory cell row chosen being determined by mapper 46, as previously described. Each register 90 corresponds to one of 864 column driver lines, BL$_n$ identified as bit line BL0 through BL863. The pixel data loaded into the secondary cells 22 by line MXFRB are timed multiplexed to control the deflection of the mirrors 18, as previously discussed, and as described in the cross referenced co-pending patent application.

Referring back to FIG. 3 and FIGS. 6–8, and as will be discussed again shortly with reference to timing diagram 18, to read data from a selected row of the memory cells 16 into each of the shift registers 90, the respective read line RL$_n$ line for this row of cells is first provided with a logic "1". This selection is accomplished by providing the proper address on address lines A0–A5 while providing lines CENB, MODE 1 and MODE 0 with a logic "0", as set forth in Table 2. With a logic "1" on the RD-WEB line, row address circuit 30 will provide a logic "1" on the read line RL$_n$ of the addressed row of memory cells 16. This logic "1" on the addressed RL$_n$ line will cause the memory contents of all secondary cells 22 of this row to be latched onto the respective bit line BL$_n$. These bit lines BL$_n$ are connected back to the Q inputs QIN of register 36, and bypass complimenter circuit 56.

Next, referring to Table 4, test control input TCNT0 and TCNT1 are provided with a logic "1" while providing a logic "1" to the RD-WEB line of FIG. 1. Therefore, test control logic circuit 38 will enable the QSEL logic line with a logic "1". Referring to FIG. 10 and FIG. 11, a logic "1" on the QSEL line enables the respective gates 93, which is preferably a transistor, to connect the memory cell contents loaded onto all lines BL0–BL863 to the input of respective shift registers 90 via the QIN input of MUXED registers 90. A clock pulse on DCLK shifts this data into register 92.

Next, referring to Table 4, test control input TCNT0 is provided with a logic "0", and test input TCNT1 is provided with a logic "1". Test control circuit 38 therefore enables the shift select line SHSEL, and register 36 is configured as a single 864-bit shift register. Referring to FIG. 11, with the shift select line SHSEL of all 864 registers 90 being enabled with a logic "1", the 864 bits of data can be serially unloaded to output line SDOUT by clocking the registers 90 with 864 clock pulses. The timing of this read operation will be discussed further in regards to timing diagrams 18, 20 and 22 which will be described shortly.

Still referring to Table 4, this data loaded into registers 90 can be shifted out in parallel when register 36 is operatively configured as 16-bit or 32-bit shift registers. This "read" configuration of the shift register 36 is established by test control lines TCNT0 and TCNT1, as shown in Table 4. Referring to Table 4, control circuit 38 will provide a logic "1" to the shift select line SHSEL of all registers 90 for all of the three "read" modes. Thus, each register 90 will be in the "shift-in" mode, accepting data from the SHIN input.

Referring to FIG. 11, when the 16-bit shift out mode is selected, with both TCNT0 and TCNT1 having a logic "0", control circuit 38 provides output enable line OUTEN27 with a logic "0" and OUTEN with a logic "1". This causes a first gate 105 of logic circuits 104 to pass data shifted to the D output line DOUT of alternating 16-bit registers 100, REG 15, REG 47 . . . REG 847 to be passed back to the respective data inputs D0, D2, . . . D52. The D output line DOUT of the other alternating 16-bit registers, REG 31, REG 63 . . . REG 863 are directly connected to the respective input line D1, D3 . . . D53 through a respective tri-state driver 108, which is enabled by a logic "1" on the line OUTEN. Sixteen (16) clock pulses are provided on the CLK to clock out all 864 bits of data from the fifty four registers 100, in parallel, to all data lines D0–D53.

When the 32-bit shift out mode is selected, control circuit 38 provides output enable line OUTEN27 with a logic "1" and output enable line OUTEN with a logic "1". This causes a second gate 103 of logic circuits 104 to pass data shifted to the D output Line DOUT of every thirty-second register 90, ie. REG 31, REG 63 . . . REG 863, back to the respective even data inputs D0, D2, . . . . D52, with the odd data inputs D1, D3 . . . D53 not being used. Thirty two clock pulses are pulses are provided on line DCLK to clock out all 864 bits of data from the twenty seven 32-bit registers, in parallel, to the even data lines D0, D2, . . . D52.

The timing of these signals for both reading and writing data to/from memory cells 16 will be discussed shortly in Reference to FIGS. 17–22.

In the preferred embodiment, shift register 36 is configured in the read mode as an 864-bit shift register, and 864 clock pulses are provided to shift the 864 bits of data from registers 90 to the shift output identified as SDOUT.

To read out the contents of another row of memory cells MR$_n$, the appropriate row of memory cells 16 is addressed by row enable circuit 30, and then the memory cell contents are latched into the 864 shift registers 90 as just described. To read the contents of the entire memory array 14, all 30 or 36 rows of memory cells, depending on the format selected, need to be individually latched into the shift registers, with these memory bits then being shifted out in one of the three read modes just described to some or all the data inputs D0, D1, . . . D53, or serially shifted out with 864 clock pulses to the serial data output SDOUT. This process is done sequentially by incrementing counter 42 with a pulse to the ACLK line.

Figure 12:
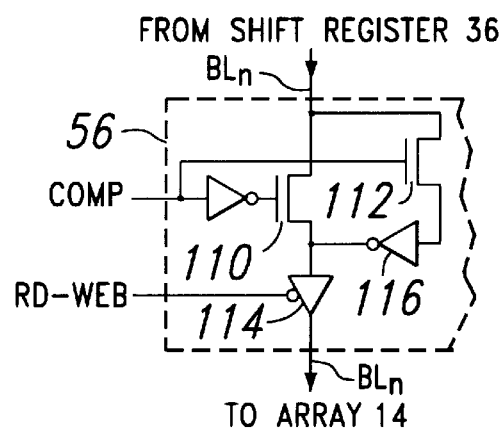
FIG. 12 is a schematic diagram of a portion of the 864-bit data complementer circuit.

Now referring to FIG. 12, the 864 bit data bi-directional complementer circuit 56 is shown. Complementer circuit 56 is seen to have a single input COMP which controls the pixel data transfer as true/false data, as shown in Table 5.

That is to say, each of the 864 inputs on BL0–BL863 will either be passed as true data, or inverted (complemented). When COMP is a logic "0", each pass transistor 110 is on and passes data to tri-state buffer/driver 114 uninverted. When COMP is a logic "1", each pass transistor 112 is on, and inverter 116 inverts the bit line data. Buffer/driver 114 is on when a logic "0" is presented on read/write line RD-WEB. This circuit is useful to alternately write all 0's or all 1's to sequential rows of memory cells 16. For instance, all of the shift registers 90 could be loaded with a logic "1" by providing a logic "1" to the LSET control line (see FIG. 10), with this logic "1" from each shift register 90 then being passed by circuit 56 true or inverted as the data is written into a row of memory cells 16.

Alternative Embodiment

Figure 13:
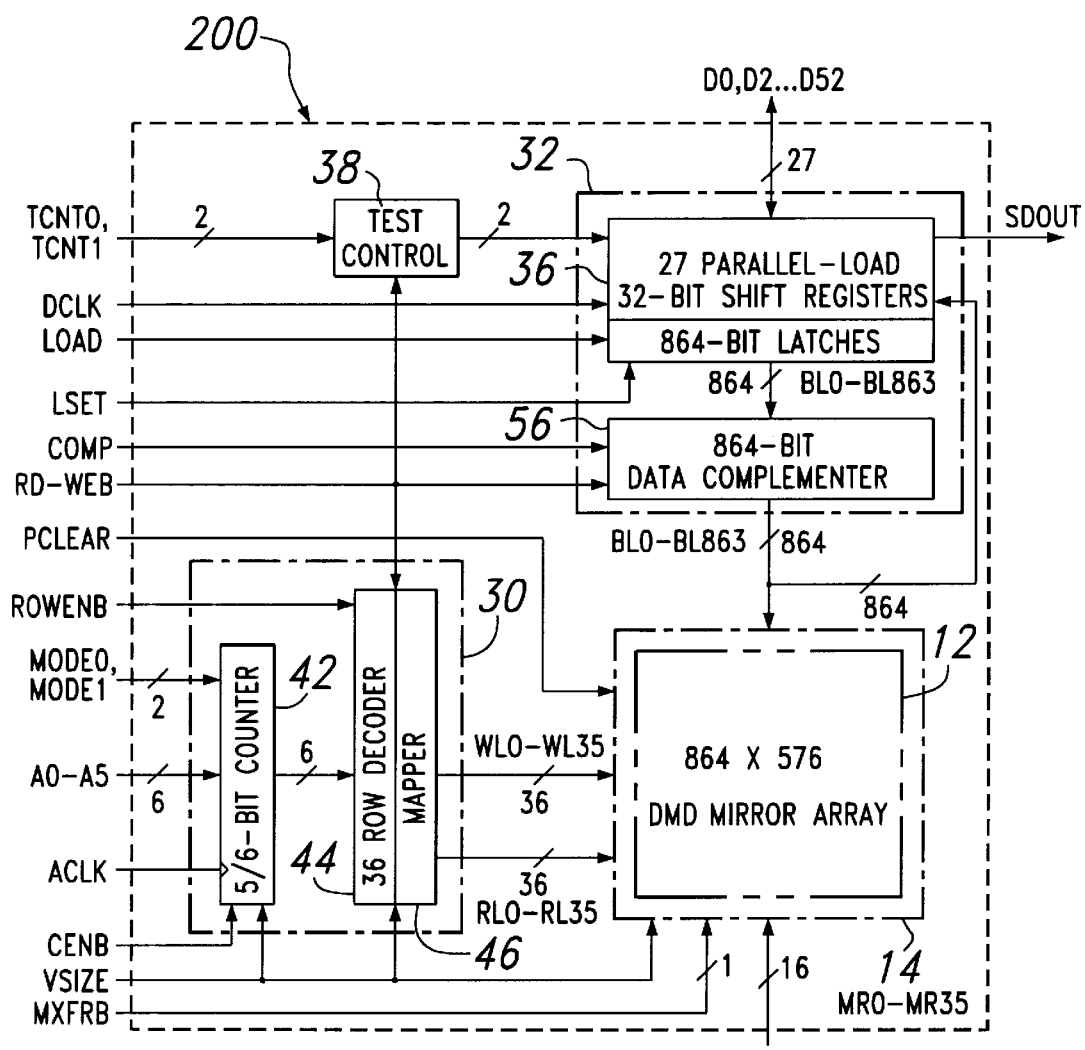
FIG. 13 is a block diagram of an alternative preferred embodiment to the invention, whereby the programmable shift register circuit is partitioned as twenty seven (27) 32-bit shift registers, implementing only twenty seven even numbered data input lines to load pixel data into the memory cell array.

Referring now to FIG. 13, an alternative preferred embodiment of the present invention is shown at 200. Pixel array 200 is identical to that of FIG. 1, except that TCNT0 is provided with a logic "0" and TCNT1 is provided with a logic "1" so that shift register 36 is operationally configured in the write mode as twenty seven (27) 32-bit shift registers 202, with only the even-numbered 27 data inputs being implemented, namely, D0, D2, . . . D52. Pixel data is provided in parallel to the D input of the first register 90 of each of the 32-bit shift registers 202, whereby 32 clock pulses are provided on line DCLK to fully load each of these 27 shift registers 202 with data. This pixel data is subsequently latched into the corresponding registers 92, and loaded into the memory array 14 as previously described. In this embodiment, the number of data inputs implemented has been reduced by 50% compared to FIG. 1. As each of these data inputs D0, D2 . . . D52 are connected to a dedicated package input pin, a package having 27 less input pins than that for FIG. 1 is realized.

Figure 14:
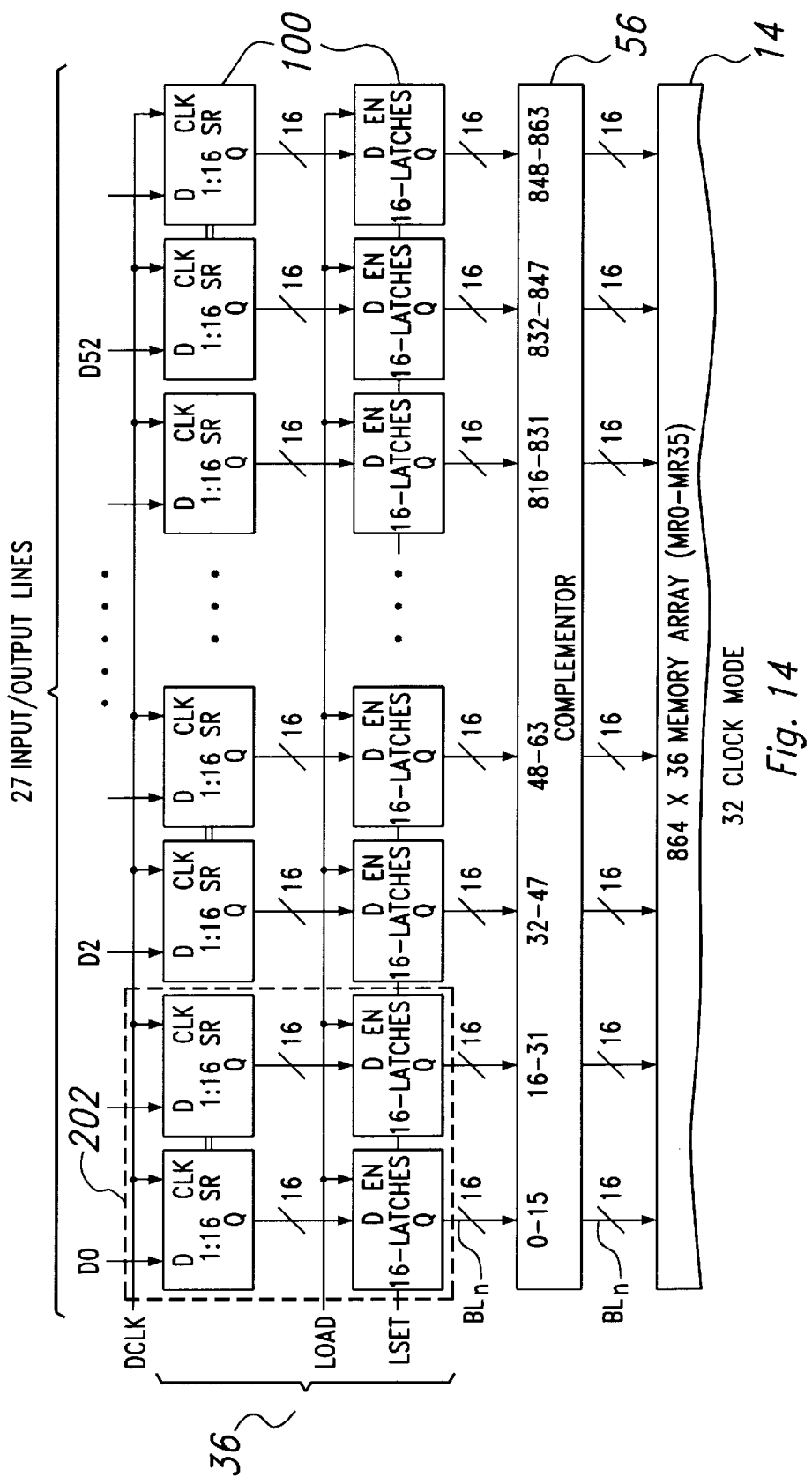
FIG. 14 is a block diagram of the shift register circuit partitioned into 27 pairs of interconnected 16-bit shift registers to obtain 32-bit shift registers.

Referring to FIG. 14, a simplified block diagram of shift register 36 configured as a plurality of twenty seven 32-bit shift registers 202 is shown. Here, it is seen that even-numbered data inputs D0, D2 . . . D52 are implemented, wherein odd numbered data input D1, D3, . . . D53 are not utilized. Referring to FIG. 11, this is because data is shifted via circuit 102 from the D output DOUT of each of alternating 16 bit shift register REG 15, REG 47 . . . REG 847 to the D input of the next 16 bit register REG 16, REG 48 . . . REG 848, thus realizing a 32-bit shift register. Referring to Table 4, it can be seen that output SEL54 has a logic "0" to cause circuit 102 to pass data between the pairs of 16-bit registers. Thirty two (32) clock pulses are provided to fully load these 32-bit shift registers. A logic "1" provided to the control line LOAD latches this pixel data from registers 92 to the Q outputs of latch 94. (See FIG. 10). The latches 94 provide their data to the respective Q output, which is connected to the input of the COMP circuit 56, which in turn has its output connected to the column drive bit lines BL0–BL863.

Data can be read back out serially on SDOUT, or in parallel on the even data input lines D0, D2, . . . D52 as previously discussed.

Referring now to FIG. 15, yet another alternative preferred embodiment of the present invention is shown. This embodiment is also identical to that of FIG. 1, except that register 36 is configured as an 864-bit shift register 302, and only one data input line, namely, D0, is implemented to load 864 bits of pixel data into shift register 36. Input line D0 is connected to the SHIN input of REG0, as shown in FIG. 11. In this configuration, as shown in Tables 4, the test control lines TCNT0 and TCNT1 are both provided with a logic "1", and test control circuit 38 thus provides a logic "1" to the shift select line SHSEL. Thus, the three input MUX of each data register 90 shifts data into register 92 from its shift input SHIN upon a clock pulse on DCLK. With data serially provided to input D0, 864 bits of data are sequentially shifted in until all 864 registers 90 labeled REG0–REG863 are loaded with pixel data.

A principal feature of this embodiment is that only one data input line is implemented, namely, D0. In this embodiment, while it takes 864 clock pulses to fully load shift register 36, only one input line is necessary, and correspondingly, only one package input pin. As compared to the embodiment of FIG. 1, this embodiment requires 53 less input pins than the integrated circuit package incorporating the preferred embodiment of FIG. 1. Memory array data of this embodiment is serially read out as previously described, with this data being serially shifted to the shift data output line SDOUT with 864 clock pulses on DCLK, as previously described.

Figure 16:
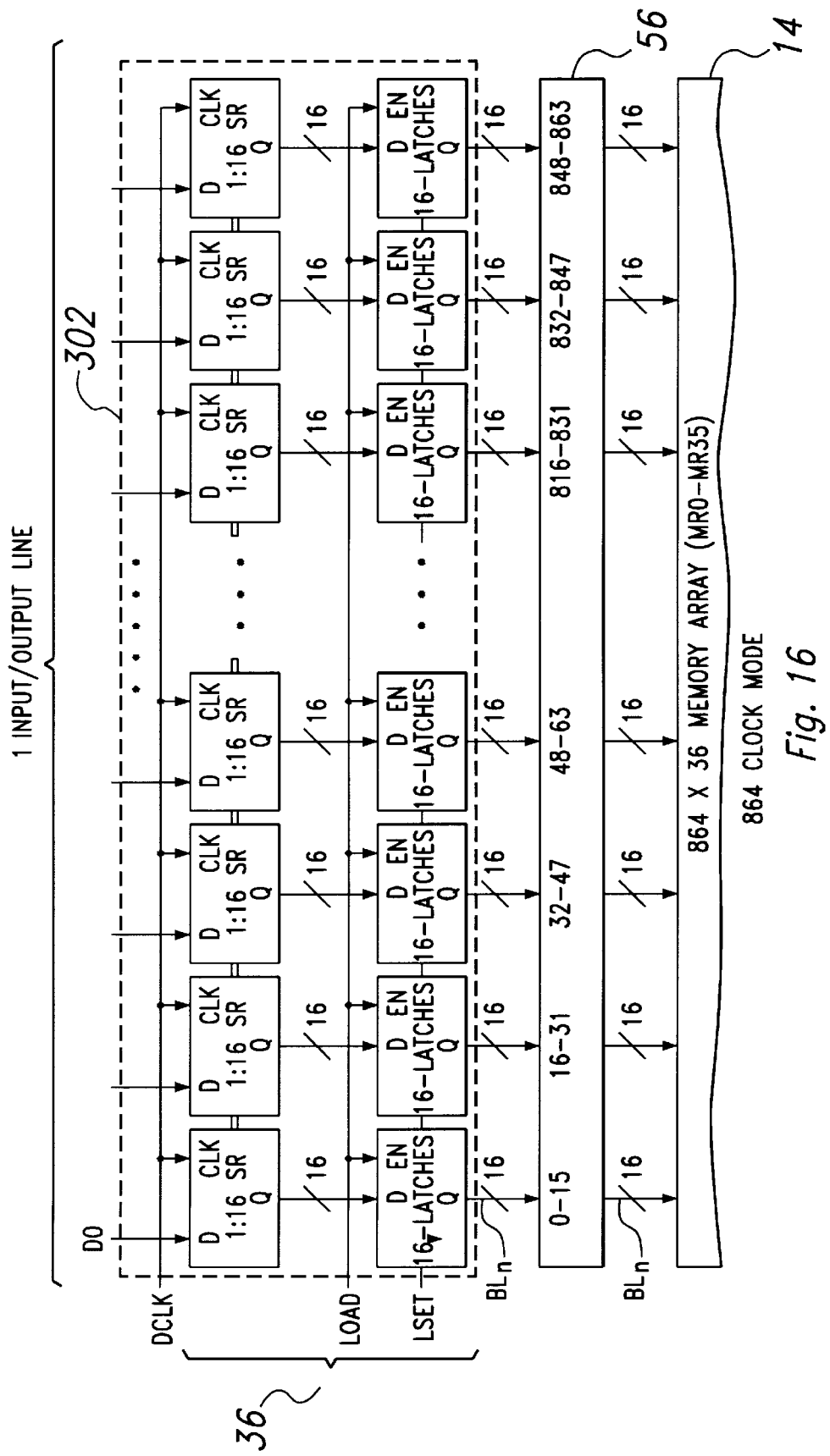
FIG. 16 is a block diagram of the shift register circuit configured as a single 864-bit serial shift register.

Referring to FIG. 16, a simplified block diagram of shift register 36 being configured as a single 864-bit shift register 302 is shown. As previously discussed in reference to FIG. 11, the D output DOUT of each shift register 90 is connected to the shift input SHIN of the next adjacent shift register 90. Both TCNT0 and TCNT1 are provided with a logic "1", and thus, test control circuit 38 provides a logic "1" to the SHSEL control line to enable gate 93 associated with input line SHIN to configure register 36 as a single 864-bit shift register. Each of the 864-bit registers 90 can have a logic "1" provided to their Q output by providing a logic "1" to the LSET, which is connected to line of each register 90 as shown in FIG. 11.

OPERATION

Figure 17:
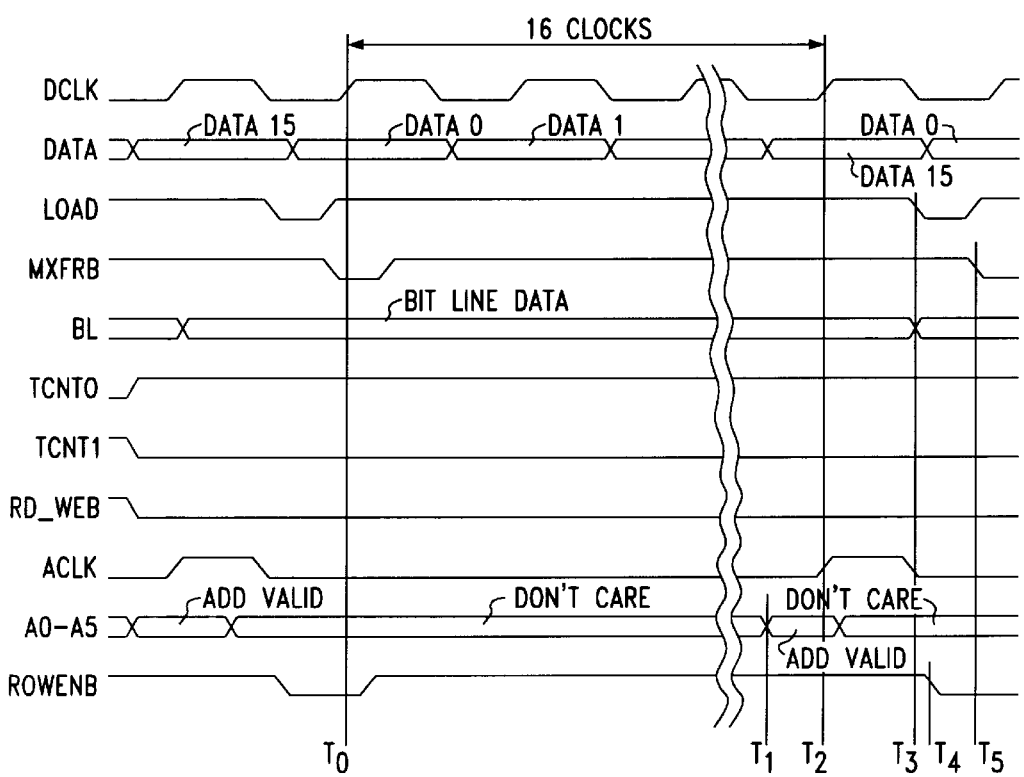
FIG. 17 is a timing diagram of the write mode for the 5-line parallel input array of that embodiment shown in FIG. 1.

Referring now to FIG. 17, a timing diagram illustrating the write operation of the fifty four (54) input preferred embodiment of FIG. 1 is shown, wherein shift register circuit 36 is partitioned as 16-bit shift registers. Pixel data and control signals are provided by an external control circuit (not shown).

For purposes of illustration, array 10 will be described as having the memory cells of memory array 14 loaded row by row, sequentially from top to bottom. In the case of Format A and Format B, as shown in FIG. 2, all 36 rows R0–R35 of memory cells 16 will be implemented. However, when Format C and D are selected, only memory cell rows are R3–R32 will be written to since the VSIZE input has a logic "1". This logic "1" on the VSIZE input also causes loading a logic "0" into the memory cells 16 of rows R0–R2 and R33–R35 (see FIG. 3).

Referring to FIG. 17, from time $T_0$ to time $T_2$, test control input TCNT0 and TCNT1 have a logic "1" and logic "0", respectively. Control line RD-WEB is a logic "0" for this period, and by referring to Table 4, it can be seen that 16 bits of pixel data will be shifted from each of data lines D0–D53 into each of the respective fifty four (54) 16-bit shift registers 100 by 16 clock pulses on DCLK. If any data lines are unused, such as for Formats B and D, the pull down registers tied to each data line (not shown) causes a logic "0" to be shifted into each associated 16-bit shift register 100.

At time $T_1$, the external control circuitry (not shown) provides address data 000000 on address lines A0–A5, with MODE 0, MODE 1 and CENB having a logic "0", this address corresponding to the "virtual" memory cell row 0 in the present example. At time $T_2$, the clock line ACLK is pulsed to a logic "1" whereby this address on A0–A5 is latched into counter 42. Also at $T_2$ the last of the 16 bits of pixel data is being loaded into registers 100.

At time T$_3$, logic line LOAD is brought to a logic "0", and data from all 864 registers 90 is then latched to the respective Q outputs, and thus the associated bit lines BL0–BL863.

At time T$_4$, the row enable line ROWENB is provided a logic "0", whereby the row decoder 44 decodes the address of counter 42. Since the row enable line ROWENB has a logic "0", and the control line RD-WEB has a logic "0", mapper 46 maps the output of row decoder 44 and provides a logic "1" to write line WL0 of memory array 14. However, if the VSIZE control line was a logic "1", and the array was operated as Format C or Format D, this address would be mapped to write a logic "1" to write line WL3 of memory array 14. (This is still the virtual row "0" for Formats C and Format D, however). If the read/write line RD-WEB was a logic "1", a logic "1" would have been written to the read line RD0 or RD3, depending on the logic of the VSIZE control line. Thus, it can be seen that mapper 46 maps the output of row decoder 44 as a function of the VSIZE control line and the read/write control line RD-WEB, when the row enable line ROWENB is a logic "0".

When a logic "1" is provided on write line WL0, this logic "1" will cause the primary memory cells 20 of the addressed row R0 to latch in the pixel data provided on bit lines BL0–BL863, and provide this pixel data to their outputs. Again, the pixel data inputs come from the comparator circuit 56, which passes the pixel data from the Q outputs of registers 90 either as true or inverted data on the 864 bit lines BL0–BL863, as a function of the COMP input. When the COMP input is a logic "0" and RD-WEB is a logic "0", data is passed as true on bit lines BL0–BL863 from registers 90 to the input of primary memory cells 20. However, if the COMP input is provided a logic "1", the pixel data from the Q output of registers 90 will be inverted, this inverted pixel data then being provided and latched into the primary memory cells 20.

At time T$_5$, the logic line MXFRB is brought to a logic "0", thereby causing the secondary memory cells 22 to latch pixel data from the respective primary cells 20 to their outputs. In effect, secondary memory cells 22 operate as a shadow latch, thus freeing the primary memory cells 20 to be subsequently reloaded with pixel data without effecting the contents of the secondary memory cells 22. The data now stored in all the secondary memory cells 22 of this addressed line of memory cells 16 will be utilized to control one of the 16 mirrors associated with each secondary cell 22 according to the split reset or timed multiplexed technique previously described and discussed in the cross referenced patent application included herein by reference.

After the pixel data has been latched into the secondary memory cells 22, pixel data can again be loaded into shift register 36 while providing another 16 clock pulses on DCLK, using the process previously described. During this data loading period T$_0$–T$_2$, the row address circuit 30 will be selecting the next row of memory cells to be written to and loaded with data once the shift register 36 is loaded with new column pixel data. In the preferred embodiment, the next row of memory cells to be written to is determined by applying a pulse on the ACLK line, while the count enable line CENB and the mode line MODE 1 have a logic "0", with MODE 0 provided with a logic "1". Referring to Table 2 and FIG. 4, it can be seen that a pulse on the ACLK line increments the count of counter 42 by one, to 000001. Only after each of the 16-bit shift registers 90 have been loaded with data will the load line LOAD be again provided with a logic "0" to latch this data onto the column drive lines BL0–BL863. When the row enable line ROWENB is again brought to a logic "0", this new set of pixel data provided on column drive lines BL0–BL863 by the Q outputs of registers 90 will be latched into the primary cells 20 of the next row of memory cells addressed, R1. Then, a logic "0" is provided to the MXFRB line to latch the data into the respective secondary memory cells 22 of this respective row of memory cells.

The entire memory array 14 can be loaded with data, sequentially, by continuing to increment the counter 42 and loading pixel data into each of the rows of memory cells. When using Formats A and Format B, counter 42 will be incremented 35 times, and a total of 36 rows of memory cells will be written to. However, when the VSIZE input is a logic "1", corresponding to the Formats C and Format D being implemented, counter 42 will only be incremented 29 times, and a total of 30 rows of memory cells will be loaded with pixel data. When using Formats C and D, with the VSIZE input having a logic "1", mapper 46 will sequentially address the middle 30 rows of memory cells, R3–R29, with row R3 being the virtual first row. Likewise, row R33 will be the last utilized row of memory cells, this row being the virtual 30th row of memory cells. Referring back to FIG. 3, with the VSIZE input having a logic "1", memory cell rows R0–R2 and R33–R35 will all be loaded with logic "0", automatically.

The forgoing data loading technique for addressing the rows of memory cells 16 is utilized irregardless of whether pixel data is loaded to some or all 864 columns of pixel cells. That is to say, when Formats B and Formats D are selected, and pixel data is not provided to inputs D0–D2 and D51–D53 or to inputs D0–D5 and D48–D53 with these inputs being pulled low, this row addressing technique is still utilized. When using Formats B and D, logic "0" will be automatically loaded into the memory cells 16 associated with these unused columns due to the pull-down registers loading a logic "0" into all of these shift registers associated with these unused columns.

After array 14 has been entirely loaded, by incrementing counter 42 as described, the counter 42 will reset back to 000000 by applying one more pulse on the ACLK line. Array 14 will be loaded 15 more times so that all 16 pixel mirrors associated with each memory cell 16 is positioned.

Another feature of the present invention is that any one selected row MR$_n$ of memory cells 16 can be written to by appropriately loading the address of the selected row into counter 42, using the setup of Table 2. This function is useful in diagnostic testing when it is desired to write a specific pixel data set into a selected row of memory cells.

Referring now to FIG. 18, a timing diagram illustrating reading the contents of a row of memory cells 16 is shown here, being MR0. At time T$_0$, the binary address of the row of memory cells to be read is provided on address lines A0–A5. This address is latched into counter 42 by a clock pulse on ACLK at Time T$_1$. At time T$_2$, it can be seen that the test control lines TCNT0 and TCNT1 have a logic "1", as does the read/write line RD-WEB. Referring to Table 4, it can be seen that test control circuit 38 will provide a logic "1" to the Q select line QSEL. Referring to FIG. 10, by providing this logic "1" to the line QSEL, the associated gate 93 for the Q input line QIN of the muxed input of each shift register 90 is enabled. At time T$_3$, and referring to FIG. 7, the line ROWENB is brought to a logic "0". This causes the decoder 44 to decode the address from the counter 42 output, whereby mapper 46 provides a logic "1" to readline RL0 since RD-WEB is a logic "1". The logic "1" on RL0 causes the secondary switch 23 associated with each bit line BL$_n$ to connect the data of all the secondary memory cells 22 to the respective column drive lines BL0–BL863.

At time $T_4$, and referring to Table 4, control circuit 38 will provide a logic "1" to the line QSEL to enable the associated gate 93 for the Qin input of registers 90. (See FIG. 10). With the rising edge of a clock pulse on DCLK, the data on all array 14 bit lines BL0–BL863 is passed through this gate 93 to the Q input and shifted into the register 92 of each register 90.

At time $T_5$, both of the test control lines TCNT0 and TCNT1 are brought to a logic "0", with the read/write line RD-WEB remaining a logic "1". Referring to Table 4, it can be seen that control circuit 38 will provide a logic "1" to the shift select line SHSEL, which enables gate 93 associated with the SHIN input of all registers 90. This line SHSEL will remain a logic "1" for 16 pulses of D clock DCLK from time $T_6$ to time $T_7$, whereby the data bit in each register 90 will be serially shifted by DCLK to the shift input SHIN of the next register 90. The 16 bits of data in each group of sixteen registers 100 will be serially output from the D output DOUT of the last shift register 90 for that group 100. Referring to FIG. 11, these D outputs DOUT of registers REG 31, REG 63 . . . REG 863 are directly connected to corresponding D inputs D1, D3 . . . D53 for reading out the data in parallel. These D outputs DOUT of registers REG 15, REG 47 . . . REG 847 are connected through gate 105 of respective circuit 104 to the even numbered inputs D0, D2 . . . D52.

Each row of memory cells Rn can be sequentially read by incrementing the counter 42 with a pulse to ACLK with MODE 0 and MODE 1 having a logic "1" and "0", respectively. Then, this procedure is repeated to latch data into the registers 90, and shift data out to lines D0–D53 as discussed. This control circuit architecture also allows any chosen row of memory cells Rn to be read by addressing counter 42, and the read procedure does not need to be sequential.

Referring now to FIG. 19, the timing diagram associated with writing pixel data to array 14 for the alternative preferred embodiment of FIG. 13 is shown. This tiling diagram corresponds to shift register 36 being configured as twenty seven (27) 32-bit shift registers 202. The addressing and latching of pixel data in/out of memory cell row Rn is the same as that described with respect to FIG. 17. During time $T_0$–$T_2$, however, it can be seen that test control input TCNT0 has a logic "0" and test control input TCNT1 has a logic "1". With the read/write line RD-WEB having a logic "0", it can be seen by referring to Table 4 that shift register 36 will be configured as a twenty seven (27) 32-bit shift registers 202. Referring to FIG. 11, this is because test control circuit 38 provides a logic "1" to the D select DSEL line, and a logic "0" to the control line SEL54. Providing a logic "0" on line SEL54 causes gate 106 of control circuit 102 to route data from the D output DOUT of alternating sixteenth registers, ie. REG 15, REG 47. . . REG 847, to the SHIN input of the next 16-bit shift register 100, corresponding to the odd inputs D1, D3 . . . D53, ie. REG 16, REG 48 . . . REG 848. Thus, pixel data is now input only at the even inputs D0, D2 . . . D52.

As can be seen in FIG. 19, 32 clocks are required on the line DCLK from time $T_0$–$T_2$ to shift 32 bits of pixel data from inputs D0, D2 . . . D52 into each of the respective 32 bit shift registers 202. At time $T_3$, the pixel data from the 32-bit shift registers 202 is latched to the respective Q outputs of register 94 (see FIG. 10) upon the falling edge of the LOAD line. This data is then latched into the primary cell 20 of a selected row of memory cells Rn upon the falling edge of the row enable line ROWENB while line RD-WEB has a logic "0", thus providing a logic "1" to write line WLn to enable primary memory cells 20, as previously discussed.

Figure 20:
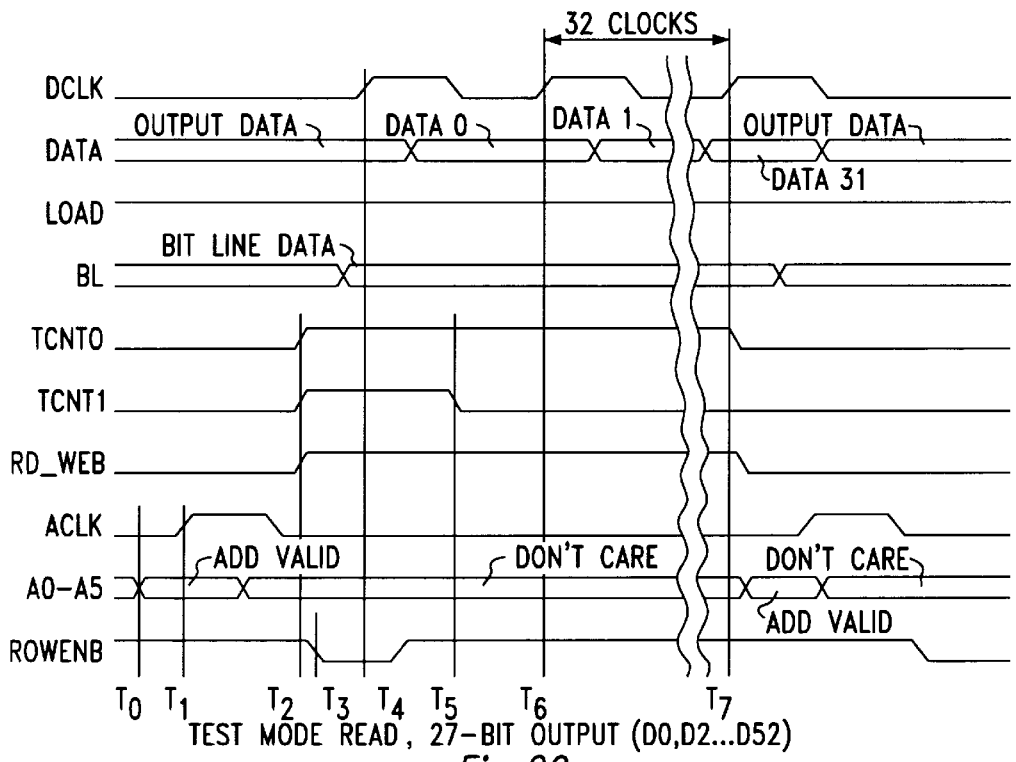
FIG. 20 is a timing diagram of the test (read) mode for the 27-line parallel output of that embodiment shown in FIG. 13.

Referring now to FIG. 20, the timing diagram for reading the contents of a row Rn of memory cells 16, for the alternative embodiment of FIG. 13 is shown. This data is shifted out in parallel on the even numbered 27 data lines D0, D2 . . . D52. The timing sequence for latching data from secondary cells 22 of a row of memory cells Rn into register 36 via the QIN inputs during time $T_0$–$T_4$ is identical to that described in reference to FIG. 18.

At time $T_5$, however, the test control line TCNT1 returns to a logic "0", while TCNT1 remains a logic "1". By referring to Table 4, it can be seen that test control circuit 38 provides both shift select control line SHSEL and the output control line OUTEN27 with a logic "1". Referring to FIGS. 10 and 11, it can be seen that each of the 864 shift registers 90 will shift data in from their SHIN input with DCLK, with data being shifted ultimately to the D output DOUT of every 32nd shift register 90, REG 31, REG 63 . . . REG 863. Because control line OUTEN27 has a logic "1", gate 103 of gate circuit 104 will connect these outputs DOUT back to the even data inputs D0, D2 . . . D52 through respective tri-state driver 108, and data is read out in parallel on these 27 data lines during 32 clock pulses on DCLK from time $T_6$ to time $T_7$. In this mode, data is not routed back from the last of each 16 shift registers REG 15, REG 47 . . . REG 847 to the even numbered data inputs D0, D2 . . . D52 because gate 105 of output logic 104 is disabled.

Figure 21:
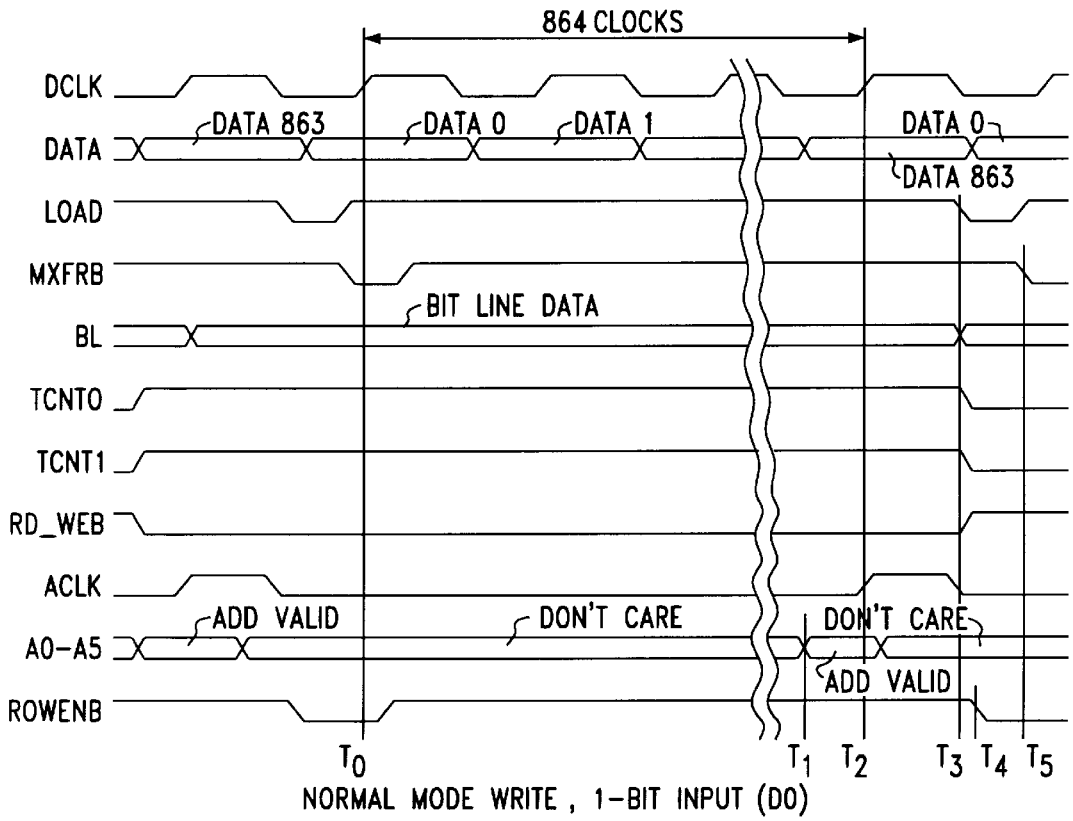
FIG. 21 is a timing diagram of the write mode writing for a single line input array of that embodiment shown in FIG. 15.

Referring now to FIG. 21, the timing diagram for loading pixel data into shift register 36 when configured as a single 864 bit serial register according to the alternative preferred embodiment of FIG. 15 is shown. Addressing of the row Rn of memory cells 16 to be written at time $T_1$–$T_2$ to is identical to that described in regards to FIGS. 17 and 19.

From time $T_0$–$T_2$, however, test control lines TCNT0 and TCNT1 both have a logic "1". Referring to Table 4, test control circuit 38 will provide a logic "1" to the shift select line SHSEL. Referring to FIG. 10, a logic "1" on the line SHSEL will enable the respective gate 93 and, thus, the mixed input of each shift register 90 is configured to shift data in from the SHIN input. Pixel data is serially loaded to only input line D0, with 864 clock pulses be provided on clock line DCLK during this period $T_0$–$T_2$ to shift 864 bits of data into the 864 bit shift register 36.

Figure 22:
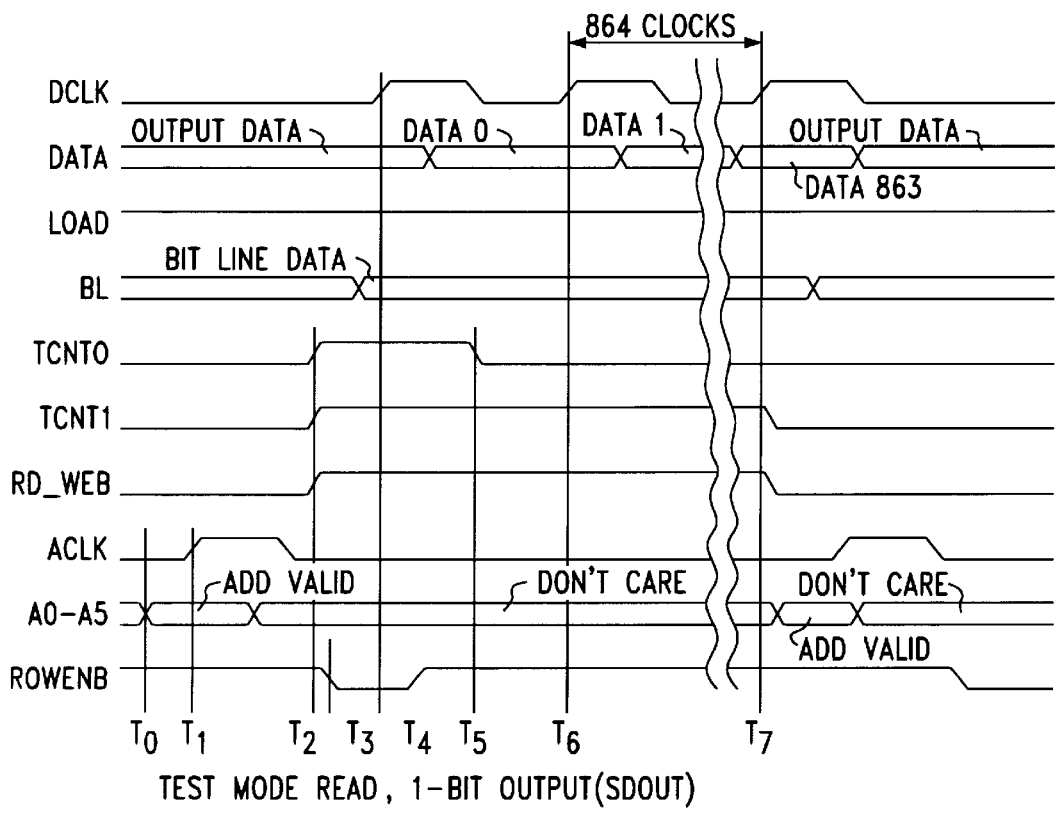
FIG. 22 is a timing diagram of the test (read) mode for the single line serial output of that embodiment shown in FIG. 15.

Referring now to FIG. 22, the timing diagram for reading the memory contents from a row of memory cells Rn to the serial data output line SDOUT is shown for the alternative preferred embodiment of FIG. 15. This process for latching pixel data from secondary cells 22 into registers 90 during time $T_0$–$T_4$ is the same as described in regards to FIG. 20. At time $T_5$, however, test control line TCNT0 is a logic "0", with test control line TCNT1 having a logic "1". Referring to Table 4, only the shift select line SHSEL will have a logic "1", with output line OUTEN27 remaining a logic "0", and each of the 864 shift registers 90 will be configured to shift in data from the shift input SHIN (see FIG. 10). Now, 864 clocks on DCLK are provided to shift all 864 bits of data of registers 90 ultimately to the output SDOUT, as shown in FIGS. 1 and 11. As shown, data is shifted from one register 90 to the next at the rising edge of each D clock pulse. Thus, the unloading of data from the 864-bit register 36 is completed at time $T_7$.

TECHNICAL ADVANTAGES

The present invention has several technical advantages. First, the device has a pixel array compatible with more than one display broadcasting format including NTSC, PAL and SECAM. The rows and columns of pixels utilized in a display is hardware programmable, with the utilized pixels being centered in the array of pixels. The programmable row address circuit automatically and sequentially addresses all, or less than all of the rows of pixels as a function of the format selected and controlled by a single control line. Column pixel data is selectively loaded into a selectively partitionable shift register so that data can be loaded only into a selected subset of pixel columns. Through the unique architecture of the present invention, a plurality of formats for display 12 are realized, these formats being controlled in hardware. The unused pixels of array 12 are automatically loaded with a logic "0", and do not contribute to the display. The present invention is a DMD single integrated circuit and is fabricated using standard processing techniques.

The unique and versatile column loading shift register circuitry is selectively formatable and partitionable, where 1, 27, or 54 input lines can be utilized to load column pixel data thereinto as depicted in Table 4. By using 54 data input lines D0–D53, the bandwidth of the data shifted into register 36 is reduced. By implementing only 1 data input line, D0, the number of pins required for the integrated circuit is significantly reduced. Thus, conventional integrated circuit packages can be utilized. In addition, the MUXED input partitionable shift register permits a row of memory cells MRn to be read in three modes, with the data being shifted out in a serial stream of 864 bits, shifted out in parallel on 27 data lines (D0, D2 . . . D52), or on all 54 data lines (D0–D53). The 3:1 multiplexed input of each shift register allows the register to load data in from the control system, shift data in from a previous register, or read data in from the memory cell array. The multiplexing is achieved using 3 control lines. Through the use of these 3 control lines, data can be conveniently loaded in and out of the memory cell array using a single shift register circuit. This design contributes to the overall testability and functionality of the design.

The row addressing scheme allows either 30 or 36 rows of memory cells to be addressed in a loop, with this selection being controlled by a single control line, and the addressing mapped to the memory cells automatically.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications. For instance, the array 12 is shown as an 864×576 pixel element array but could be of other selected dimensions if desired, such as 1000×2000. In addition, the control circuitry can be used to control more or less pixel rows and associated memory cells, and use more or less columns of pixels to realize other formats. This is done by loading data only into the particular data input lines associated with a chosen format, such as D10–D43 to use the middle 544 columns of memory cells, with the unused data input lines being automatically pulled low to load a logic "0" into the unused portions of the associated shift register 100. The number of pixel rows is determined by programming the count limit of count detector 76 in FIG. 6, whereby, for instance, the count limit could be set at 23 when VSIZE is a logic "1" to implement only the middle 24 rows of memory cells in this format.

We claim:

1. A monolithic programmable format pixel array device, comprising:

a plurality of pixels forming a pixel array, said array having m rows of pixels and n columns of pixels formed upon a monolithic substrate;

row address circuitry coupled to each of said rows of pixels for selectively and concurrently addressing said m rows of pixels, said row address circuitry including circuitry to select and control a subset of less than m said pixel rows and place the non-selected pixel rows in an inoperative state, said row address circuitry comprising a row decoder circuit providing a decoded output as a function of signals provided to an address input and a mapper responsive to said decoded output and having a function input, said mapper controlling which m pixel rows are addressed as a function of said decoded output from a given address input as a function of said function input to said mapper; and column data load circuitry coupled to said n columns of pixels for loading data to predetermined ones of said columns.

2. The device as specified in claim 1 wherein said column data load circuitry means further comprises formatting for selectively loading said data to a subset of less than n said pixel columns.

3. The device as specified in claim 2 where said subset of n pixel columns comprises a middle portion of said pixel array.

4. The device as claimed in claim 3 wherein said row address circuitry includes circuitry to selectively address one of a plurality of different subsets of less than m pixel rows and/or n pixel columns.

5. The device as claimed in claim 2 wherein said row address circuitry includes circuitry to selectively address one of a plurality of different subsets of less than m pixel rows and/or n pixel columns.

6. The device as specified in claim 1 wherein said subset of m pixel rows comprises a middle portion of said pixel array.

7. The device as claimed in claim 6 wherein said row address circuitry includes circuitry to selectively address one of a plurality of different subsets of less than m pixel rows and/or n pixel columns.

8. The device as specified in claim 1 wherein said row address circuitry comprises a row decoder circuit.

9. The device as claimed in claim 8 wherein said row address circuitry includes circuitry to selectively address one of a plurality of different subsets of less than m pixel rows and/or n pixel columns.

10. The device as specified in claim 1 wherein said row address circuitry further comprises a variable counter circuit asynchronously driving said row decoder circuit.

11. The device as specified in claim 10 wherein said variable counter circuit has a size input and a clock input, whereby said counter circuit asynchronously incrementally counts up to an upper value as a function of a signal provided on said clock input, said upper value being determined as a function of a signal provided to said size input.

12. The device as claimed in claim 11 wherein said row address circuitry includes circuitry to selectively address one of a plurality of different subsets of less than m pixel rows and/or n pixel columns.

13. The device as claimed in claim 10 wherein said row address circuitry includes circuitry to selectively address one of a plurality of different subsets of less than m pixel rows and/or n pixel columns.

14. The device as specified in claim 1 wherein said column data load circuitry comprises a shift register circuit.

15. The device as specified in claim 14 wherein said shift register circuit has a shift input, said shift register circuit being selectively partitionable into a plurality of shift registers as a function of a signal provided to said shift input, each said shift register coupled to a dedicated set of said pixel columns.

16. The device as specified in claim 15 wherein said shift registers are comprised of serial input parallel output devices.

17. The device as specified in claim 14 wherein said shift register circuit has a read/write input, whereby said shift register circuit loads said data to said pixels and reads said data from said pixels as a function of a signal provided to said read/write input.

18. The device as specified in claim 17 wherein at least one said shift register has a MUXED input, and a MUX control input, whereby said shift register shifts said data in from said pixels or from an external source via said MUXED input as a function of a signal on said MUX control input.

19. The device as specified in claim 18 wherein at least one said shift register can also shift said data in from another said shift register via said MUXED input as a function of a signal on said MUX control input.

20. The device as specified in claim 14 further including a data complementer circuit between said shift register circuit and said n pixel columns, said data complementer circuit having a data input, a data output, and a comp input whereby data provided to said data input is passed to said data output either inverted or true as a function of a signal provided to said comp input.

21. The device as claimed in claim 14 wherein said row address circuitry includes circuitry to selectively address one of a plurality of different subsets of less than m pixel rows and/or n pixel columns.

22. The device as specified in claim 1 wherein said pixels form a spatial light modulator.

23. The device as specified in claim 22 wherein said pixels comprise a digital micro mirror device including a plurality of mirrors positioned over addressing circuitry.

24. The device as claimed in claim 1 wherein said row address circuitry includes circuitry to selectively address one of a plurality of different subsets of less than m pixel rows and/or n pixel columns.

* * * * *